United States Patent [19]
Ito et al.

[11] Patent Number: 5,724,154
[45] Date of Patent: Mar. 3, 1998

[54] IMAGE PROCESSING APPARATUS WITH MULTIPLE FUNCTIONS

[75] Inventors: Hirohiko Ito, Kawasaki; Keishi Inaba; Masahiro Iwadate, both of Yokohama, all of Japan

[73] Assignee: Canon Kabushiki Kaisha, Tokyo, Japan

[21] Appl. No.: 794,458

[22] Filed: Feb. 4, 1997

Related U.S. Application Data

[63] Continuation of Ser. No. 219,547, Mar. 29, 1994, abandoned.

[30] Foreign Application Priority Data

Mar. 31, 1993 [JP] Japan ............... 5-094917

[51] Int. Cl.$^6$ .................. H04N 1/00; H04N 1/21
[52] U.S. Cl. ........................ 358/400; 358/296
[58] Field of Search ........................ 358/296, 400, 358/300, 302, 401, 404, 444, 468, 437, 448; 347/247, 237

[56] References Cited

U.S. PATENT DOCUMENTS 5,107,339  4/1992  Bertoni et al. ................. 358/296

FOREIGN PATENT DOCUMENTS 0469865  7/1991  European Pat. Off. .
4305777  10/1992  Japan .

OTHER PUBLICATIONS

Patent Abstracts of Japan, vol. 17, No. 122 (P-1501), Mar. 15, 1993.
A. M. Lister, *"Fundamentals Of Operating Systems"*, 1979, The Macmillan Press Ltd., London and Basingstoke, p. 102, line 1–p. 106, line 17.

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

An image processing apparatus for controlling an execution order of a plurality of processing operations comprises an input device for inputting a plurality of jobs for image processing, a storage device for storing the plurality of jobs input by the input device and a controller for sorting an execution order of the plurality of jobs stored in the storage device in accordance with times required for processing of each of the jobs, and further sorting the execution order of the plurality of sorted jobs in accordance with whether each of the jobs corresponds to an image input or an image output, wherein the controller executes each of the jobs according to the execution order of the plurality of sorted job.

20 Claims, 16 Drawing Sheets

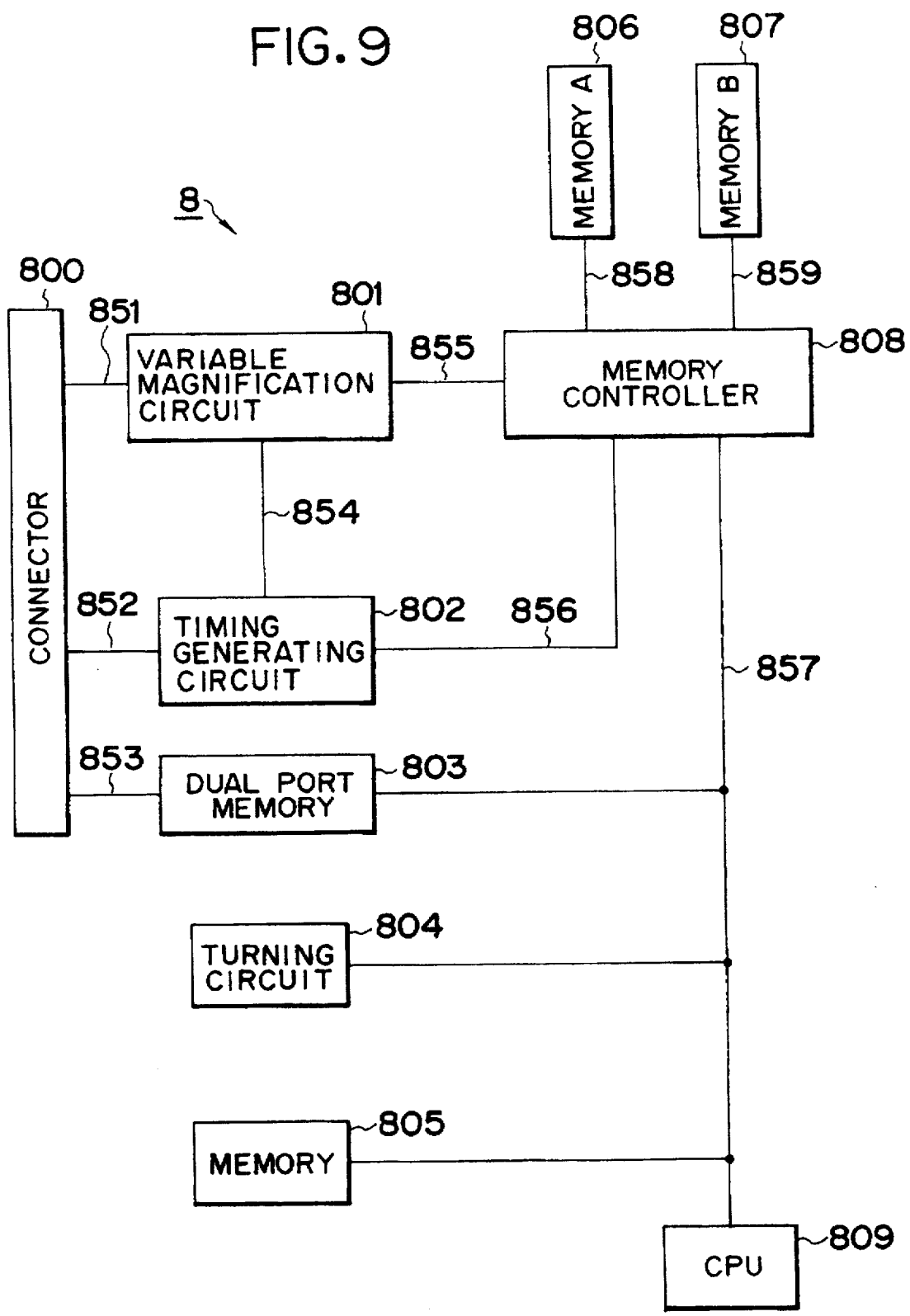

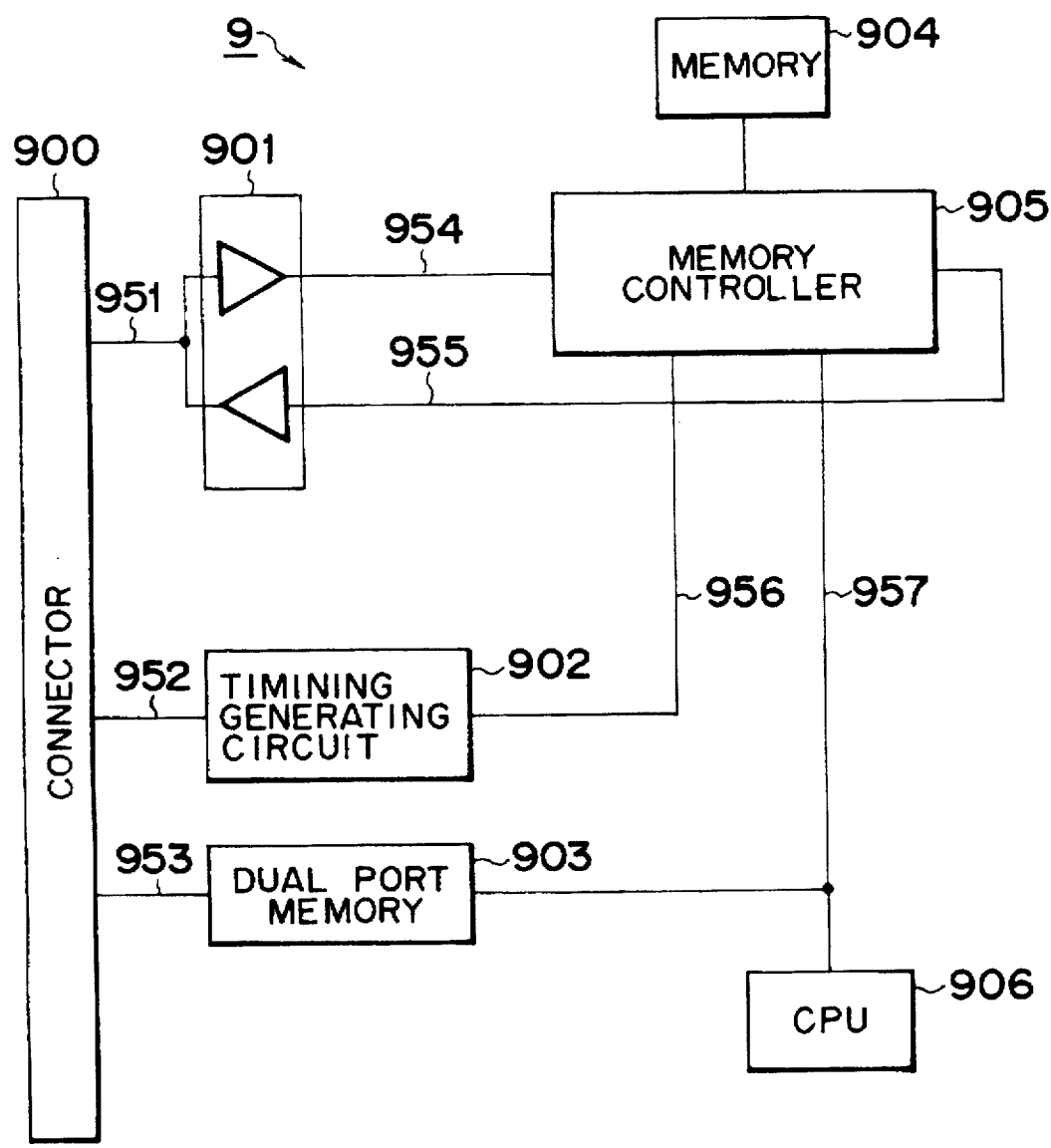

FIG. 11

| COMMAND | IMAGE INPUT REQUIREMENT COMMAND CODE | — 2000 |
|---|---|---|
| IMAGE I/O MANAGEMENT | IMAGE REQUEST UNIT ID<br>IMAGE TRANSMITTING SIDE UNIT ID<br>IMAGE RECEIVING SIDE UNIT ID | — 2001<br>— 2002<br>— 2003 |
| IMAGE ATTRIBUTE INFORMATION MANAGEMENT | DELAY QUANTITY OF HORIZONTAL SCANNING DIRECTION<br>DELAY QUANTITY OF VERTICAL SCANNING DIRECTION<br>NUMBER OF PIXELS OF HORIZONTAL SCANNING DIRECTION<br>NUMBER OF PIXELS OF VERTICAL SCANNING DIRECTION<br>RESOLUTION OF HORIZONTAL SCANNING DIRECTION<br>RESOLUTION OF VERTICAL SCANNING DIRECTION | — 2004<br>— 2005<br>— 2006<br>— 2007<br>— 2008<br>— 2009 |
| IMAGE PROCESSING MANAGEMENT | NUMBER OF COPY OF IMAGE<br>TURNING ANGLE<br>RESOLUTION CONVERSION | — 2010<br>— 2011<br>— 2012 |

FIG. 12

| | |
|---|---|
| SEQUENCE STEP | ~2100 |
| JOB NUMBER | ~2101 |
| IMAGE REQUEST UNIT ID | ~2102 |
| IMAGE TRANSMITTING SIDE UNIT ID | ~2103 |
| IMAGE RECEIVING SIDE UNIT ID | ~2104 |
| RESOLUTION CONVERSION UNIT | ~2105 |
| JOB STATUS | ~2106 |
| IMAGE TRANSMITTING SIDE STATUS | ~2107 |
| IMAGE RECEIVING SIDE STATUS | ~2108 |
| NUMBER OF FINISHED COPY | ~2109 |
| CONTINUATION FLAG | ~2110 |
| TURNING ANGLE | ~2111 |

FIG. 13

| |
|---|
| RESOLUTION CONVERSION DESIGNATION ~2200 |
| DELAY QUANTITY OF HORIZONTAL SCANNING DIRECTION ~2201 |
| DELAY QUANTITY OF VERTICAL SCANNING DIRECTION ~2202 |
| NUMBER OF PIXELS OF HORIZONTAL SCANNING DIRECTION ~2203 |
| NUMBER OF PIXELS OF VERTICAL SCANNING DIRECTION ~2204 |
| RESOLUTION OF HORIZONTAL SCANNING DIRECTION ~2205 |
| RESOLUTION OF VERTICAL SCANNING DIRECTION ~2206 |
| TURNING REQUEST ~2207 |
| NUMBER OF COPY ~2208 |

FIG.17A

| IMAGE INPUT S1 (1) | IMAGE INPUT S2 (1) | IMAGE OUTPUT P1 (1) | IMAGE OUTPUT P2 (4) | IMAGE INPUT S3 (1) | IMAGE OUTPUT P3 (1) |

FIG.17B

| IMAGE INPUT S1 (1) | IMAGE INPUT S2 (1) | IMAGE OUTPUT P1 (1) | IMAGE INPUT S3 (1) | IMAGE OUTPUT P3 (1) | IMAGE OUTPUT P2 (4) |

FIG.17C

| IMAGE INPUT S1 (1) | IMAGE OUTPUT P1 (1) | IMAGE INPUT S2 (1) | IMAGE OUTPUT P3 (1) | IMAGE INPUT S3 (1) | IMAGE OUTPUT P2 (4) |

IMAGE PROCESSING APPARATUS WITH MULTIPLE FUNCTIONS

This application is a continuation of application Ser. No. 08/219,547 filed Mar. 29, 1994, which is now abandoned.

BACKGROUND OF THE INVENTION

1. Field of the Invention

The present invention relates to control of an execution order of a plurality of processing operations in an image processing apparatus with multiple functions.

2. Related Background Art

In recent years, a multiple functions apparatus, which performs facsimile communication using a scanner and a printer of a digital copying machine, or developing code data from a computer into bit map data and printing out the developed data using the printer of the digital copying machine, is commercially available.

In such a multiple functions apparatus, at least three of, e.g., a copying function, a facsimile function, a printer formatter function, an image filing function, an image memory function, and the like are incorporated in one unit.

In a multiple functions image processing apparatus with the above-mentioned arrangement, the respective functions share a scanner and printer, thus realizing space saving and cost down.

Furthermore, upon execution of each function processing in the multiple functions image processing apparatus, input/output processing of image data during execution of each function processing using a scanner and a printer is executed using a half-duplex video bus in terms of easy control and cost down.

However, in order to allow a plurality of functions to share a single scanner and printer, and since input and output image data between copying function processing and another function processing are transferred using a half-duplex communication type video bus, for example, image data developed by a printer formatter processing unit cannot be output to the printer simultaneously while the scanner is being used for image reading processing for facsimile transmission. In addition, image data searched by the image filing function cannot be printed out simultaneously while document data received by the facsimile function is printed out.

SUMMARY OF THE INVENTION

It is an object of the present invention to provide an image processing apparatus which can eliminate the above-mentioned drawbacks.

It is another object of the present invention to provide an image processing apparatus which determines an execution order of simultaneously generated input/output requests in accordance with a predetermined priority order, can greatly improve processing efficiency upon generation of execution requests of respective processing operations, and realizes apparent parallel processing of image input/output processing operations.

It is still another object of the present invention to provide an image processing apparatus which determines an execution order of a plurality of processing requests in accordance with their execution times, thereby improving processing efficiency.

It is still another object of the present invention to provide an image processing apparatus which determines an execution order of a plurality of processing requests in accordance with whether these requests are image input requests or image output requests, thereby improving processing efficiency.

The above and other objects of the present invention will become apparent from the following description taken in conjunction with the accompanying drawings and the appended claims.

BRIEF DESCRIPTION OF THE DRAWINGS

FIG. 9 is a block diagram for explaining the detailed arrangement of a formatter unit shown in FIG. 1;

FIG. 10 is a block diagram for explaining the detailed arrangement of an image memory unit shown in FIG. 1;

FIG. 11 is a view showing an example of command packets in the multiple functions image processing apparatus according to the present invention;

FIG. 12 is a view showing an example of an image transfer job management table in the multiple functions image processing apparatus according to the present invention;

FIG. 13 is a view showing an example of an image transfer parameter table in the multiple functions image processing apparatus according to the present invention;

FIGS. 17A to 17C are views for explaining the priority setting control state of jobs in the multiple functions image processing apparatus according to the present invention.

DETAILED DESCRIPTION OF THE PREFERRED EMBODIMENT

Figure 1:
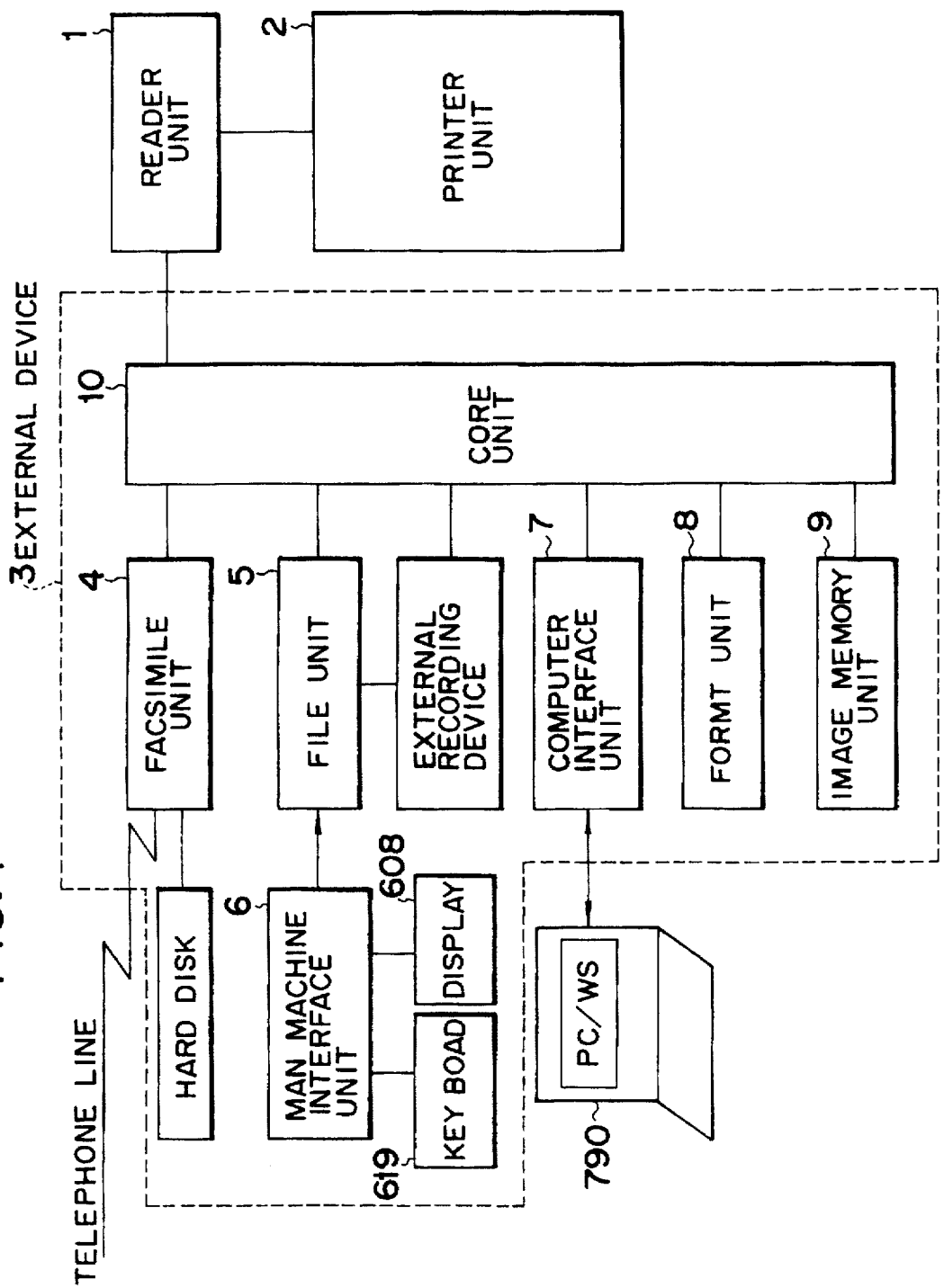
FIG. 1 is a block diagram for explaining the arrangement of a multiple functions image processing apparatus according to an embodiment of the present invention.

FIG. 1 is a block diagram for explaining the arrangement of a multiple functions image processing apparatus according to an embodiment of the present invention.

Referring to FIG. 1, an image input device (to be referred to as a reader unit hereinafter) 1 converts an original image into image data, and an image output device (to be referred to as a printer unit hereinafter) 2 has a plurality of different recording sheet cassettes, and outputs image data onto a recording sheet as a visual image in accordance with a print command. A peripheral device control device (external device) 3 is electrically connected to the reader unit 1, and has various functions. The peripheral device control device 3 comprises a facsimile unit 4, a file unit 5, a man-machine interface unit 6 connected to the file unit 5, a computer interface unit 7 for allowing a connection of a computer 790, a formatter unit 8 for converting information from the computer into a visual image, an image memory unit 9 for storing information from the reader unit 1, and for temporarily storing information sent from the computer, a core unit 10 for controlling the function units 1 to 8, and the like.

The functions of the units 1 to 8 will be described in detail below.

Figure 2:
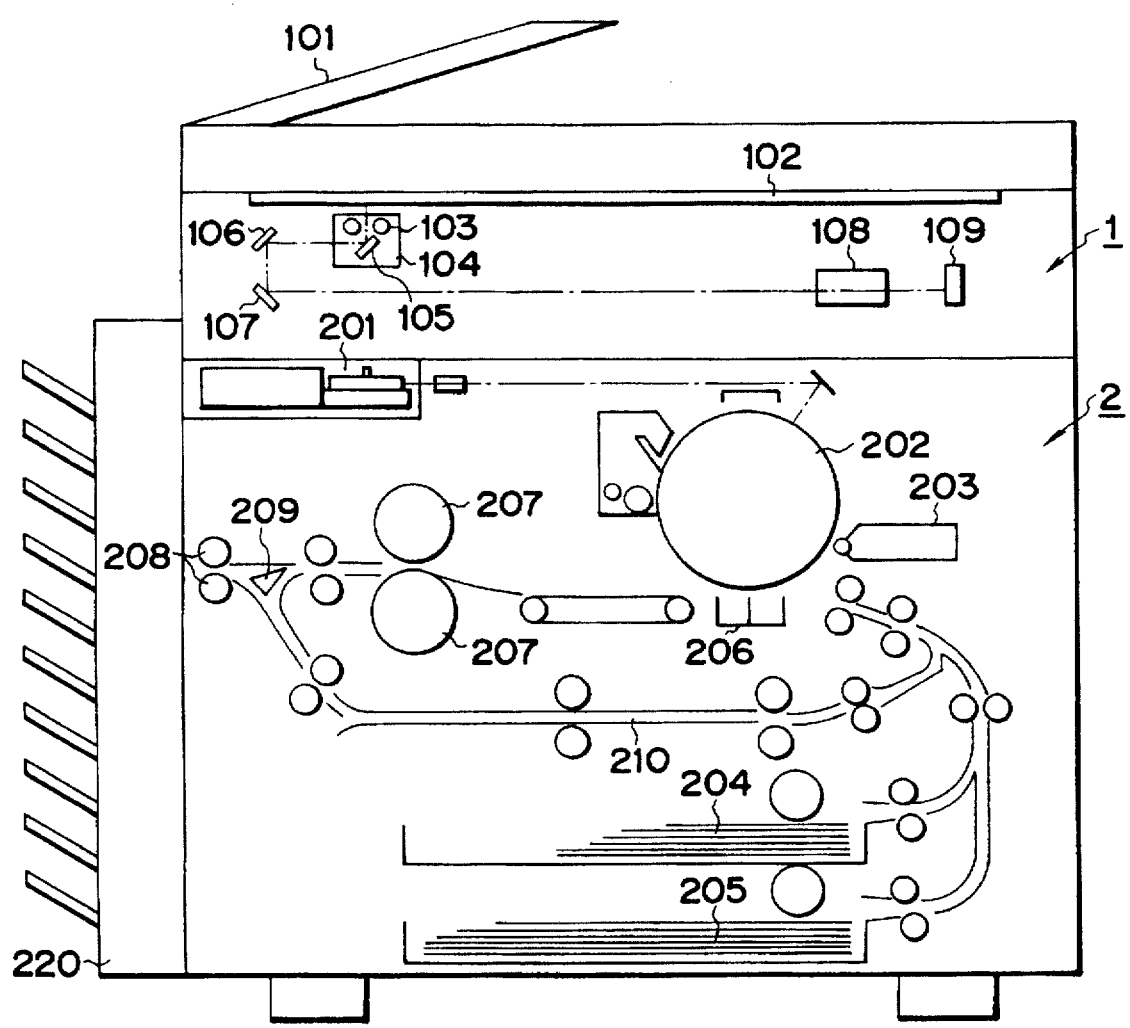
FIG. 2 is a sectional view showing the arrangement of a reader unit and a printer unit shown in FIG. 1.

FIG. 2 is a sectional view showing the arrangement of the reader unit 1 and the printer unit 2 shown in FIG. 1. The arrangement and operation of these units will be described below.

Originals stacked on an original feeder 101 are sequentially conveyed one by one onto an original table glass surface 102. When an original is conveyed, a lamp 103 of a scanner unit 104 is turned on, and the scanner unit 104 is moved to illuminate the original. Light reflected by the original is transmitted through a lens 108 via mirrors 105, 106, and 107 in turn, and is then input to a CCD image sensor unit (to be referred to as a CCD hereinafter) 109.

Figure 3:
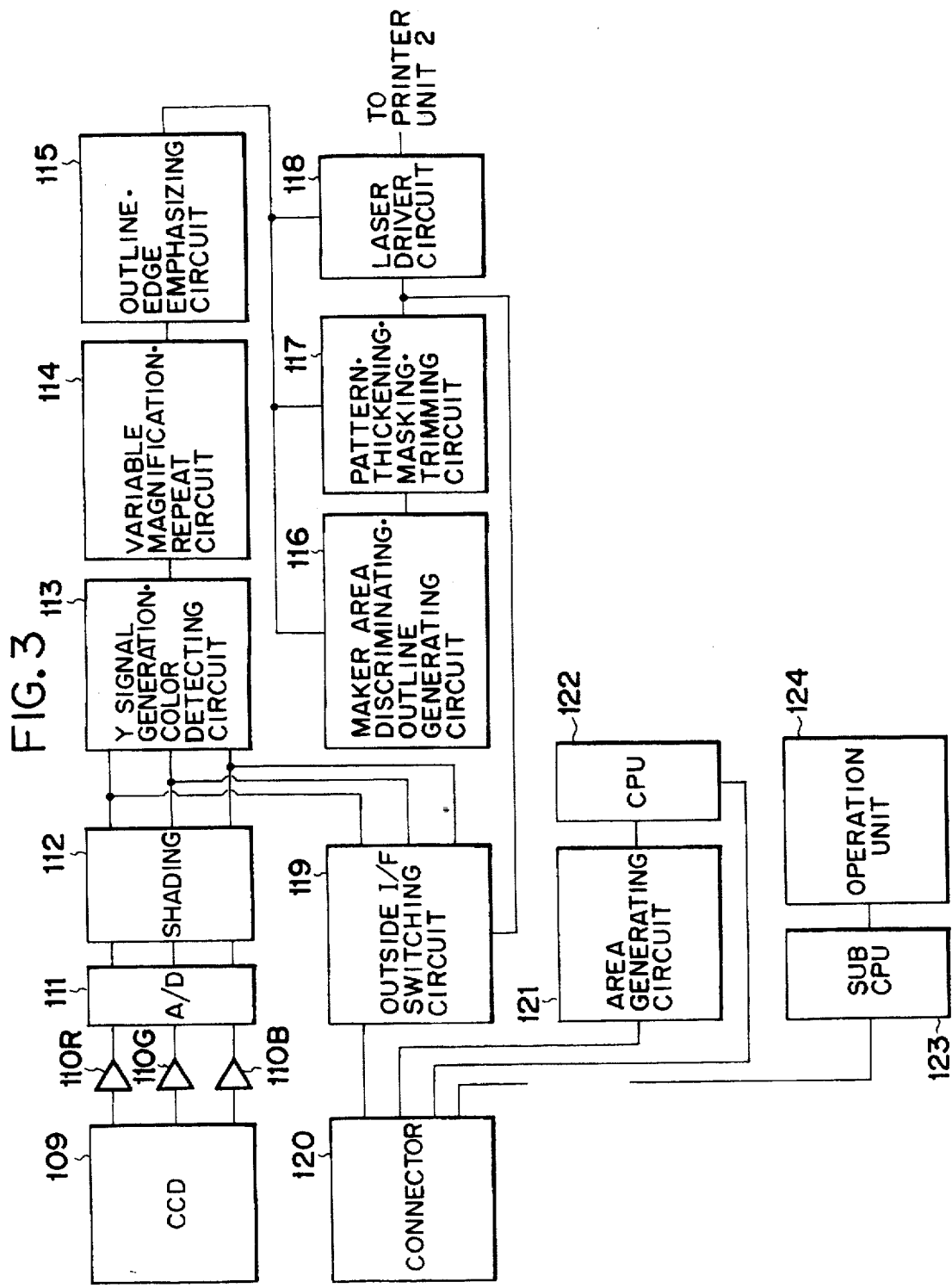
FIG. 3 is a block diagram showing the signal processing arrangement of the reader unit shown in FIG. 2.

FIG. 3 is a block diagram showing the signal processing arrangement of the reader unit 1 shown in FIG. 2. The arrangement and operation of the reader unit 1 will be described below.

Image information input to the CCD 109 is photoelectrically converted into an electrical signal. Color information from the CCD 109 is amplified by amplifiers 110R, 110G, and 110B in correspondence with the input signal level of an A/D converter 111. The output signals from the A/D converter 111 are input to a shading circuit 112, so as to correct light distribution nonuniformity of the lamp 103 and sensitivity nonuniformity of the CCD. The output signals from the shading circuit 112 are input to a Y signal generation-.color detecting circuit 113 and an outside I/F switching circuit 119. The Y signal generation.color detecting circuit 113 performs a calculation based on equation (1) below using the signals from the shading circuit 112 to obtain a Y signal:

$$Y = 0.3R + 0.6G + 0.1B \quad (1)$$

Furthermore, the circuit 113 has a color detecting circuit for separating R, G, and B signals into seven colors, and outputting signals corresponding to the separated colors. The output signal from the Y signal generation.color detecting circuit 113 is input to a variable magnification repeat circuit 114. Variable magnification processing in the sub-scanning direction is achieved by the scanning speed of the scanner unit 104, and variable magnification processing in the main scanning direction is achieved by the variable magnification.repeat circuit 114. The variable magnification.repeat circuit 114 can output a plurality of identical images. An outline edge emphasizing circuit 115 obtains edge emphasis information and outline information by emphasizing the high-frequency components of the signal output from the variable magnification.repeat circuit. The signal output from the outline.edge emphasizing circuit 115 is supplied to a marker area discriminating.outline generating circuit 116 and a pattern.thickening.masking trimming circuit 117. The marker area discriminating outline generating circuit 116 reads a portion written with a marker pen in a designed color on an original, and generates marker outline information. The pattern.thickening.masking.trimming circuit 117 performs thickening masking and trimming of the input signal on the basis of the generated outline information. Also, the pattern.thickening.masking trimming circuit 117 makes a pattern by a color detected signal detected by the Y signal generation color detecting circuit 113. The output signal from the pattern.thickening.masking.trimming circuit 117 is supplied to a laser driver circuit 118, and the signal subjected to the various kinds of processing is converted into a signal for driving a laser. The output signal from the laser driver circuit is supplied to the printer unit 2, and image formation is performed to obtain a visual image.

The outside I/F switching circuit 119 for interfacing with the peripheral device control device will be described below.

When image information from the reader unit 1 is to be output to the peripheral device control device 3, the outside I/F switching circuit 119 outputs image information from the pattern.thickening.masking.trimming circuit 117 to a connector 120. When the reader unit 1 receives image information from the peripheral device control device 3, the outside I/F switching circuit 119 inputs image information from the connector 120 to the Y signal generation color detecting circuit 113.

The above-mentioned image information is transferred under the control of a CPU 122. An area generating circuit 121 generates various timing signals necessary for the image processing on the basis of a value set by the CPU 122. Also, the CPU 122 communicates with the peripheral device control device 3 using its internal communication function. A sub CPU 123 controls an operation unit 124, and communicates with the peripheral device control device 3 using its internal communication function.

The arrangement and operation of the printer unit 2 will be described below with reference to FIG. 2.

An image signal input to the printer unit 2 is converted into an optical signal by an exposure control unit 201, and is radiated as a light beam onto a photosensitive body 202. A latent image formed on the photosensitive body 202 by the radiated beam is developed by a developer 203. A transfer sheet is conveyed from a transfer sheet stacking unit 204 or 205 in synchronism with the latent image, and the developed image is transferred onto the transfer sheet by a transfer unit 206. The transferred image is fixed on the transfer sheet by a fixing unit 207, and the transfer sheet is exhausted outside the apparatus by an exhaust unit 208. If a sort function is active, the transfer sheet output from the exhaust unit 208 is exhausted onto a corresponding bin of a sorter 220; if the sort function is inactive, the transfer sheet is exhausted onto the uppermost bin of the sorter.

Subsequently, a method of outputting images on two surfaces of a single output sheet will be described below. An output sheet on which an image is fixed by the fixing unit 207 is temporarily conveyed to the exhaust unit 208, and is then conveyed to a re-feed transfer sheet stacking unit 210 via a convey direction switching member 209 for reversing the convey direction of a sheet. When the next original is prepared, the original image is read by the same process as in the above-mentioned process. In this case, since the transfer sheet is fed from the re-feed transfer sheet stacking unit 210, two original images can be respectively output onto the upper and lower surfaces of a single sheet.

The system arrangement and operation of the peripheral device control device 3 shown in FIG. 1 will be described below.

The peripheral device control device 3 is connected to the reader unit 1 via a cable, and the core unit therein controls respective signals and functions. The peripheral device control device 3 includes the facsimile unit 4 for transmitting/receiving facsimile data, the file unit 5 for preserving various kinds of original information by converting them into electrical signals, the formatter unit 8 for developing code information from the computer into image information, the computer interface unit 7 for interfacing with the computer, the image memory unit 9 for storing information from the reader unit 1, and for temporarily storing information sent from the computer, and the core unit 10 for controlling the respective functions.

The arrangement and operation of the core unit 10 in the peripheral device control device 3 will be described below with reference to the block diagram shown in FIG. 4.

Figure 4:
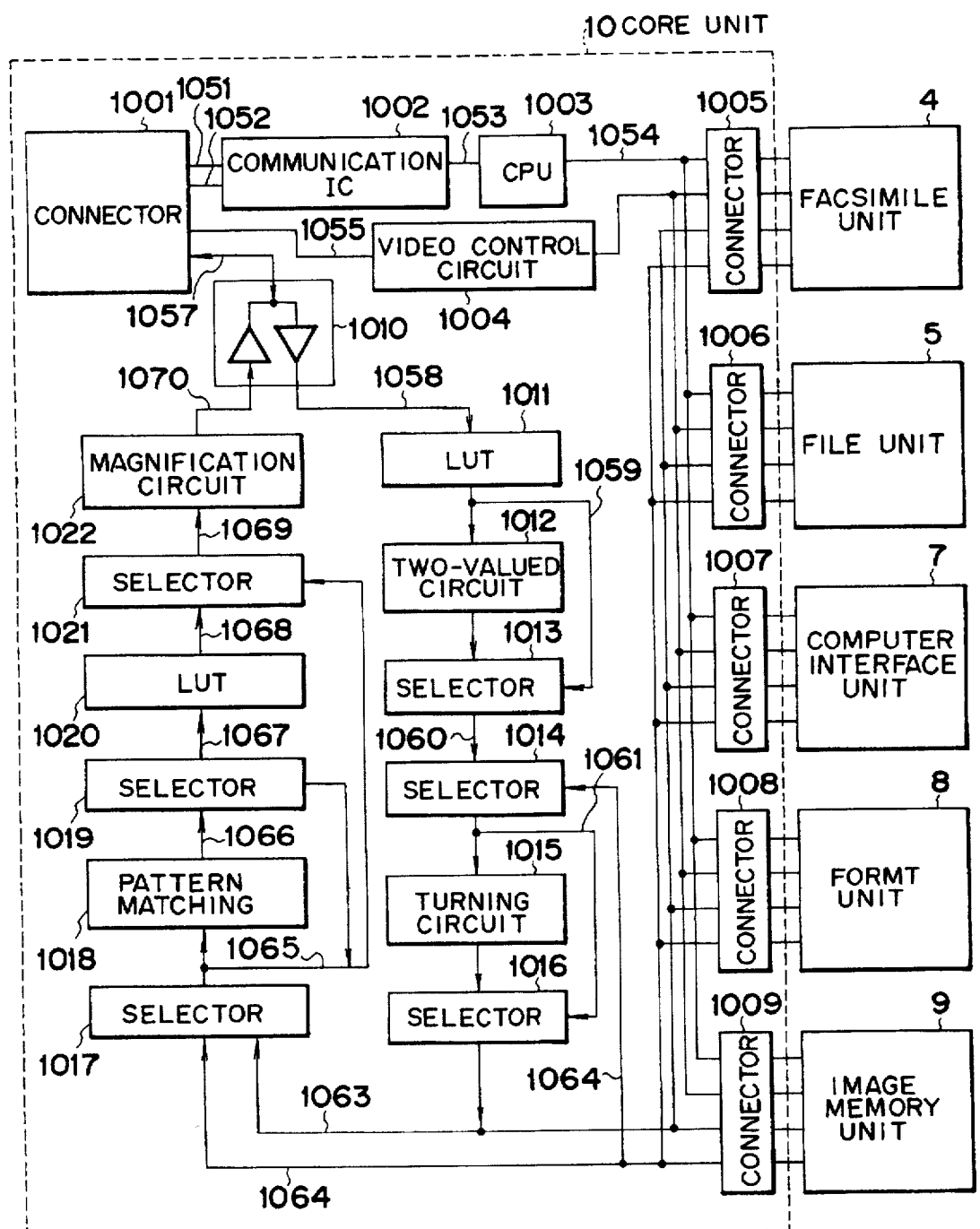
FIG. 4 is a block diagram showing the detailed arrangement of a core unit shown in FIG. 1.

FIG. 4 is a block diagram showing the detailed arrangement of the core unit 10 shown in FIG. 1.

A connector 1001 of the core unit 10 is connected to the connector 120 of the reader unit 1 via a cable.

The connector 1001 incorporates four different signal lines. A signal line 1057 is an 8-bit multi-valued video signal line. A signal line 1055 is a control signal line for controlling a video signal, and a signal line 1051 is a signal line used in communications with the CPU 122 in the reader unit 1. A signal line 1052 is a signal line used in communications with the sub CPU 123 in the reader unit 1. The signal lines 1051 and 1052 are subjected to communication protocol processing by a communication IC 1002, and transmit communication information to a CPU 1003 via a CPU bus 1053.

The signal line 1057 is a bidirectional video signal line. That is, the signal line 1057 allows the core unit 10 to receive information from the reader unit 1, and also allows the core unit 10 to output information to the reader unit 1. The signal line 1057 is connected to a buffer 1010, and is separated from the bidirectional signal line into unidirectional signal lines 1058 and 1070. The signal line 1058 is an 8-bit multi-valued video signal line from the reader unit 1, and is connected to an LUT 1011. The LUT 1011 converts image information from the reader unit 1 into a desired density value by looking up a look-up table. An output signal line 1059 from the LUT 1011 is connected to a two-valued circuit 1012 and a selector 1013. The two-valued circuit 1012 has a simple two-valued function for converting a signal on the multi-valued signal line 1059 into two-valued data with a fixed slice level, a two-valued function using a variable slice level which varies depending on the density values of pixels around a pixel of interest, and a two-valued function using an error diffusion method. When the two-valued information is 0, it is converted into a multi-valued signal 00H; when the two-valued information is 1, it is converted into FFH. The converted signal is supplied to the selector 1013. The selector 1013 selects one of the signal from the LUT 1011 and the output signal from the two-valued circuit 1012. A signal line 1060 from the selector 1013 is connected to a selector 1014. The selector 1014 selects one of a signal on the output signal line 1060 of the selector 1013 and a signal on a signal line 1064 which outputs video signals from the facsimile unit 4, the file unit 5, the computer interface unit 7, the formatter unit 8, and the image memory unit 9, and is input to the core unit 10 via connectors 1005, 1006, 1007, 1008, and 1009, in accordance with an instruction from the CPU 1003. An output signal line 1061 of the selector 1014 is input to a turning circuit 1015 or a selector 1016. The turning circuit 1015 has a function of rotating an input image signal through +90°, −90°, or +180°. Information output from the reader unit 1 is converted into a two-valued signal by the two-valued circuit 1012, and the two-valued signal is stored in the turning circuit 1015 as information from the reader unit. Then, the turning circuit 1015 turns and reads out the stored information in accordance with an instruction from the CPU 1003. The selector 1016 selects one of a signal on an output signal line 1062 of the turning circuit 1015 and the input signal line 1061 to the turning circuit 1015, and outputs the selected signal, as a signal on a signal line 1063, to the connector 1005 with the facsimile unit 4, the connector 1006 with the file unit 5, the connector 1007 with the computer interface unit 7, the connector 1008 with the formatter unit 8, the connector 1009 with the image memory unit 9, and a selector 1017.

The signal line 1063 is a synchronous 8-bit unidirectional video bus for transferring image information from the core unit 10 to the facsimile unit 4, the file unit 5, the computer interface unit 7, the formatter unit 8, and the image memory unit 9. A signal line 1064 is a synchronous 8-bit unidirectional video bus for transferring image information from the facsimile unit 4, the file unit 5, the computer interface unit 7, the formatter unit 8, and the image memory unit 9. A video control circuit 1004 controls the synchronous buses of the signal lines 1063 and 1064 using a signal on its output signal line 1056 from the video control circuit 1004. The connectors 1005 to 1009 are connected to a signal line 1054 in addition to the above-mentioned signal lines. The signal line 1054 is a bidirectional 16-bit CPU bus, and is used for exchanging data commands by an asynchronous method. Information transfer between the core unit 10 and the facsimile unit 4, the file unit 5, the computer interface unit 7, the formatter unit 8, and the image memory unit 9 can be realized by the above-mentioned two video buses 1063 and 1064, and the CPU bus 1054.

The signal line 1064 from the facsimile unit 4, the file unit 5, the computer interface unit 7, the formatter unit 8, and the image memory unit 9 is input to the selectors 1014 and 1017. The selector 1014 inputs a signal on the signal line 1064 to the turning circuit 1015 in accordance with an instruction from the CPU 1003.

The selector 1017 selects one of signals on the signal lines 1063 and 1064 in accordance with an instruction from the CPU 1003. A signal on an output signal line 1065 of the selector 1017 is input to a pattern matching circuit 1018 and a selector 1019. The pattern matching circuit 1018 performs pattern matching between the signal from the signal line 1065 and a predetermined pattern. When the two patterns coincide with each other, the pattern matching circuit 1018 outputs a predetermined multi-valued signal onto a signal line 1066. When the two patterns do not coincide with each other, the pattern matching circuit 1018 outputs a signal on the signal line 1065 onto the signal line 1066.

The selector 1019 selects one of signals on the signal lines 1065 and 1066 in accordance with an instruction from the CPU 1003. The output signal from the selector 1019 is supplied to an LUT 1020 via a signal line 1067.

The LUT 1020 converts a signal on the signal line 1067 in correspondence with the characteristics of the printer unit when image information is output to the printer unit 2.

A selector 1021 selects one of a signal on an output signal line 1068 of the LUT 1020 and a signal on the signal line 1065 in accordance with an instruction from the CPU 1003. A signal on an output signal line 1069 of the selector 1021 is input to a magnification circuit 1022.

The magnification circuit 1022 can independently set magnification factors in the X direction (sub-scanning direction) and the Y direction (main scanning direction) in accordance with an instruction from the CPU 1003. A magnification method is a first-order linear interpolation method. An output signal line 1070 of the magnification circuit 1022 is input to the buffer 1010.

A signal on the signal line 1070 input to the buffer 1010 is supplied to the printer unit 2 via the connector 1001 through the bidirectional signal line 1057, and is printed out by the printer unit 2, in accordance with an instruction from the CPU 1003.

The flow of signals between the core unit and other units will be described below.

Operation of Core Unit Based on Information from Facsimile Unit

A case will be explained below wherein information is to be output to the facsimile unit 4. The CPU 1003 communicates with the CPU 122 of the reader unit 1 via the communication IC 1002, and issues an original scan command. Upon reception of this command, the reader unit 1 causes the scanner unit 104 to scan an original, and outputs the read image information to the connector 120. The reader unit 1 and the peripheral device control device 3 are connected to each other through a cable, and information from the reader unit 1 is input to the connector 1001 of the core unit 10. The image information input to the connector 1001 is input to the buffer 1010 via the multi-valued 8-bit signal line 1057. The buffer 1010 inputs the signal on the bidirectional signal line 1057 to the LUT 1011 via the signal line 1058 as a unidirectional signal in accordance with an instruction from the CPU 1003. The LUT 1011 converts the image information from the reader 1 into a desired density value using the look-up table. For example, a background image of an original can be removed. The output signal line 1059 of the LUT 1011 is input to the two-valued circuit 1012. The two-valued circuit 1012 converts an 8-bit multi-valued signal on the signal line 1059 into a two-valued signal. When the two-valued signal is 0, the two-valued circuit 1012 converts it into a multi-valued signal 00H; when the two-valued signal is 1, the circuit 1012 converts it into a multi-valued signal FFH. The output signal from the two-valued circuit 1012 is input to the turning circuit 1015 and the selector 1016 via the selectors 1013 and 1014. A signal on the output signal line 1062 of the turning circuit 1015 is also input to the selector 1016. The selector 1016 selects one of the signals on the signal lines 1061 and 1062. The signal selection is determined by the CPU 1003 which communicates with the facsimile unit 4 via the CPU bus 1054. A signal on the output signal line 1063 from the selector 1016 is supplied to the facsimile unit 4 via the connector 1005.

Next, a case will be explained below wherein information from the facsimile unit 4 is to be received. Image information from the facsimile unit 4 is transmitted onto the signal line 1064 via the connector 1005. The signal on the signal line 1064 is input to the selectors 1014 and 1017. When image information received by the facsimile unit is to be turned and the turned image is to be output to the printer unit 2 in accordance with an instruction from the CPU 1003, the signal on the signal line 1064 input to the selector 1014 undergoes turning processing in the turning circuit 1015. The signal on the output signal line 1062 from the turning circuit 1015 is supplied to the pattern matching circuit 1018 via the selectors 1016 and 1017. When the image information received by the facsimile unit is to be directly output to the printer unit 2 in accordance with an instruction from the CPU 1003, the signal on the signal line 1064 input to the selector 1017 is input to the pattern matching circuit 1018.

The pattern matching circuit 1018 has a smoothing function of smoothing indentations of oblique line portions of an image received by the facsimile unit. The pattern-matched signal is input to the LUT 1020 via the selector 1019. The table in the LUT 1020 can be changed by the CPU 1003, so that an image received by the facsimile unit can be output with a desired density by the printer unit 2. The signal on the output signal line 1068 of the LUT 1020 is input to the magnification circuit 1022 via the selector 1021. The magnification circuit 1022 performs magnification processing of the 8-bit multi-valued signal having two values (00H, FFH) by the first-order linear interpolation method. An 8-bit multi-valued signal which is output from the magnification circuit 1022 and assumes a value ranging from 00H to FFH is supplied to the reader unit 1 via the buffer 1010 and the connector 1001. The reader unit 1 supplies this signal to the outside I/F switching circuit 119 via the connector 120. The outside I/F switching circuit 119 supplies the signal from the facsimile unit 4 to the Y signal generation.color detecting circuit 113. The output signal from the Y signal generation-.color detecting circuit 113 is subjected to the above-mentioned processing, and thereafter, is output to the printer unit 2, thus performing image formation on an output sheet.

Operation of Core Unit Based on Information from File Unit

A case will be exemplified below wherein information is to be output to the file unit 5. The CPU 1003 communicates with the CPU 122 of the reader unit 1 via the communication IC 1002, and issues an original scan command. Upon reception of this command, the reader unit 1 causes the scanner unit 104 to scan an original, and outputs the read image information to the connector 120. The reader unit 1 and the peripheral device control device 3 are connected to each other through a cable, and information from the reader unit 1 is input to the connector 1001 of the core unit 10. The image information input to the connector 1001 is transmitted onto the unidirectional signal line 1058 via the buffer 1010. A multi-valued 8-bit signal on the signal line 1058 is converted into a signal with a desired density value by the LUT 1011. A signal on the output signal line 1059 of the LUT 1011 is input to the connector 1006 via the selectors 1013, 1014, and 1016. More specifically, the 8-bit multi-valued signal is directly transferred to the file unit 5 without using the functions of the two-valued circuit 1012 and the turning circuit 1015. When a two-valued signal is to be filed by communications with the file unit 5 via the CPU bus 1054 of the CPU 1003, the functions of the two-valued circuit 1012 and the turning circuit 1015 are used. Since the two-valued processing and turning processing are the same as those for the facsimile unit, a detailed description thereof will be omitted.

Next, a case will be explained below wherein information is to be output from the file unit 5. Image information from the file unit 5 is input to the selector 1014 or 1017 via the connector 1006 and the signal line 1064. In an 8-bit multi-valued filing mode, an image signal is input to the selector 1017; in a two-valued filing mode, an image signal can be input to the selector 1014 or 1017. In the two-valued filing mode, since the same processing as that for the facsimile unit is performed, a detailed description thereof will be omitted. In the multi-valued filing mode, a signal on the output signal line 1065 from the selector 1017 is input to the LUT 1020 via the selector 1019. The LUT 1020 generates a look-up table in correspondence with a desired print density in accordance with an instruction from the CPU 1003. A signal on the output signal line 1068 from the LUT 1020 is input to the magnification circuit 1022 via the selector 1021. A signal on the 8-bit multi-valued signal line 1070, which signal is magnified at a desired magnification factor by the magnification circuit 1022, is supplied to the reader unit 1 via the buffer 1010 and the connector 1001. Information from the file unit, which is supplied to the reader unit 1, is output to the printer unit 2, and image formation is performed on an output sheet in the same manner as the above-mentioned processing for the facsimile unit.

Operation of Core Unit Based on Information from Computer Interface Unit

The computer interface unit 7 interfaces with the computer connected to the peripheral device control device 3. The computer interface unit 7 has, as computer interfaces, SCSI, RS232C, and Centronics interfaces. The computer interface unit 7 has the above-mentioned three different interfaces, and information from each interface is supplied to the CPU 1003 via the connector 1007 and the data bus 1054. The CPU 1003 performs various kinds of control on the basis of the received contents.

Operation of Core Unit Based on Information from Formatter Unit

The formatter unit 8 has a function of developing command data of, e.g., a document file supplied from the above-mentioned computer interface unit 7 into image data. When the CPU 1003 determines that data sent from the computer interface unit 7 via the data bus 1054 is data associated with the formatter unit, it transfers the data to the formatter unit via the connector 1008. The formatter unit 8 develops the transferred data onto an image data memory.

A sequence for receiving information from the formatter unit 8, and performing image formation onto an output sheet will be described below. Image information from the formatter unit 8 is transmitted onto the signal line 1064 via the connector 1008 as a multi-valued signal having two values (00H, FFH). The signal on the signal line 1064 is input to the selector 1014 or 1017. The selector 1014 and 1017 are controlled by an instruction from the CPU 1003. Thereafter, the same processing as that for the facsimile unit is performed, and a detailed description thereof will be omitted.

Operation of Core Unit Based on Information from Image Memory Unit

A case will be explained below wherein information is to be output to the image memory unit 9. The CPU 1003 communicates with the CPU 122 of the reader unit 1 via the communication IC 1002, and issues an original scan command. Upon reception of this command, the reader unit 1 causes the scanner unit 104 to scan an original, and outputs the read image information to the connector 120. Information from the reader unit 1 is input to the connector 1001 of the core unit 10. The image information input to the connector 1001 is supplied to the LUT 1011 via the multi-valued 8-bit signal line 1057 and the buffer 1010. A signal on the output signal line 1059 of the LUT 1011 is transferred to the image memory unit 9 via the selectors 1013, 1014, and 1016, and the connector 1009. Image information stored in the image memory unit 9 is supplied to the CPU 1003 via the connector 1009 and the CPU bus 1054. The CPU 1003 transfers the data supplied from the image memory unit 9 to the above-mentioned computer interface unit 7. The computer interface unit 7 transfers the received data to the computer (the work station 790 in this embodiment) via a desired one of the three different interfaces (SCSI, RS232C, and Centronics).

A case will be explained below wherein information is to be received from the image memory unit 9. Image information from the computer is supplied to the core unit 10 via the computer interface unit 7. When the CPU 1003 of the core unit 10 determines that data supplied from the computer interface unit 7 via the CPU bus 1054 is data associated with image memory unit 9, it transfers the data to the image memory unit 9 via the connector 1009. The image memory unit 9 transfers an 8-bit multi-valued signal on the signal line 1064 to the selector 1014 or 1017 via the connector 1009. The output signal from the selector 1014 or 1017 is output to the printer unit 2, and image formation is performed onto an output sheet, in accordance with an instruction from the CPU 1003 in the same manner as the above-mentioned processing for the facsimile unit 4.

The arrangement of the facsimile unit 4 shown in FIG. 1 will be described below with reference to the block diagram shown in FIG. 5.

Figure 5:
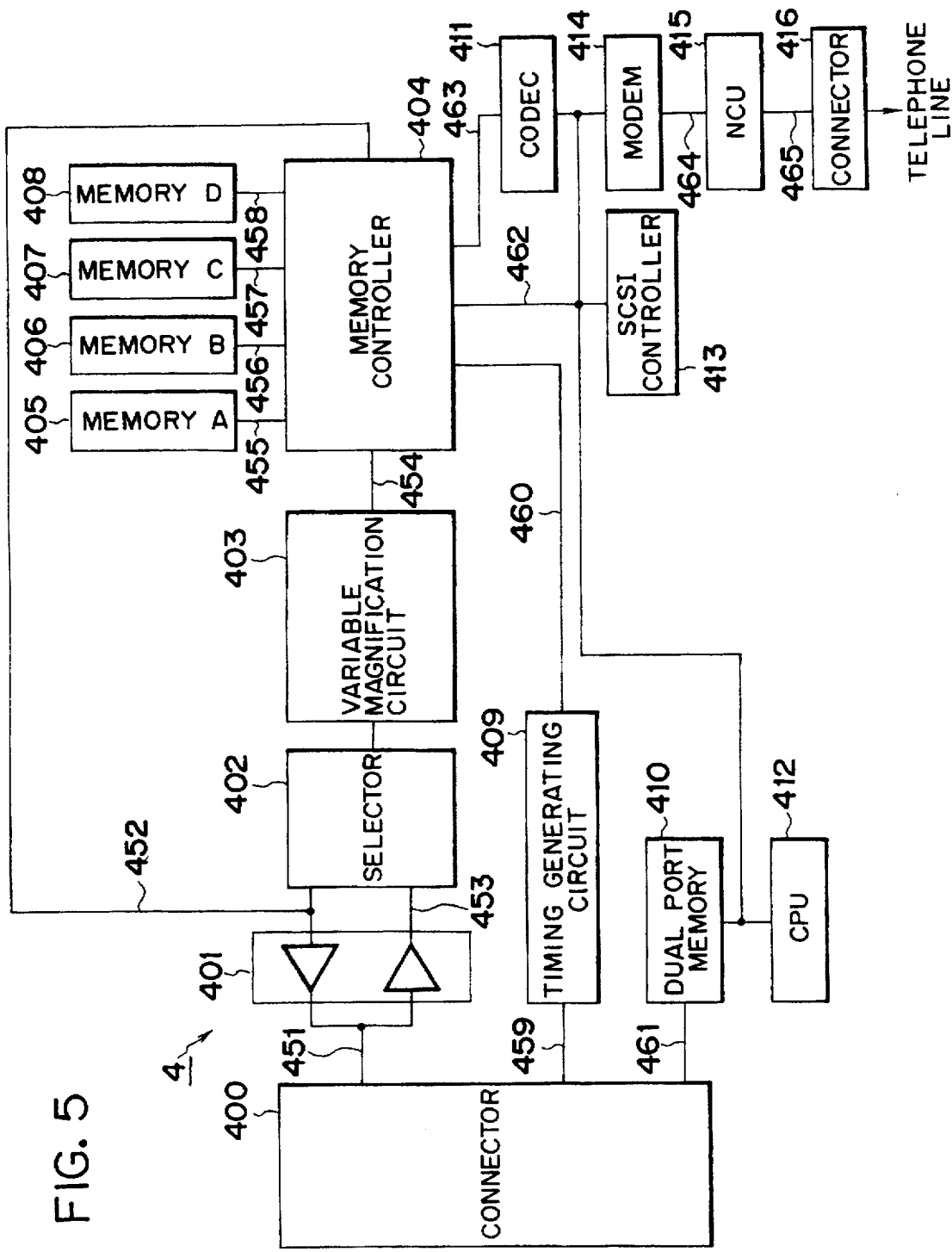
FIG. 5 is a block diagram for explaining the detailed arrangement of a facsimile unit shown in FIG. 1.

FIG. 5 is a block diagram for explaining the detailed arrangement of the facsimile unit 4 shown in FIG. 1.

The facsimile unit 4 is connected to the core unit 10 via a connector 400, and exchanges various signals with the core unit 10. A signal line 451 is a bidirectional two-valued image signal line. A buffer 401 separates the bidirectional signal line 451 into an output signal line 452 from the facsimile unit 4 and an input signal line 453 to the facsimile unit 4. Signals on the signal lines 452 and 453 are input to a selector 402, and the selector 402 selects one of the two input signals in accordance with an instruction from a CPU 412. When two-valued information from the core unit 10 is to be stored in one of memories A 405 to D 408, the selector 402 selects the signal on the signal line 453. When data is to be transferred from one memory (one of the memories A 405 to D 408) to another memory, the selector 402 selects the signal on the signal line 452. The output signal from the selector 402 is input to a variable magnification circuit 403, and is subjected to variable magnification processing. The variable magnification circuit 403 converts the resolution of data to be transmitted in correspondence with that of a receiving facsimile unit when facsimile transmission is performed at a reading resolution of 400 DPI of the reader unit 1. A signal on an output signal line 454 of the variable magnification circuit 403 is stored in one of the memories A 405, B 406, C 407, and D 408, or a memory circuit obtained by cascade-connecting two memories under the control of a memory controller 404. The memory controller 404 has four functions, i.e., a first mode for exchanging data between the memories A 405 to D 408 and a CPU bus 462 in accordance with an instruction from the CPU 412, a second mode for exchanging data with a CODEC bus 463 of a CODEC 411 having encoding and decoding functions, a third mode for storing two-valued video input data on the signal line 454 in one of the memories A 405 to D 408 under the control of a timing generating circuit 409, and a fourth mode for reading out the memory contents of one of the memories A 405 to D 408, and outputting the readout contents onto a readout signal line 452. Each of the memories A 405 to D 408 has a capacity of 2 Mbytes, and stores an A4-size image or equivalent at a resolution of 400 DPI. The timing generating circuit 409 is connected to the connector 400 via a signal line 459, is started by control signals HSYNC, HEN, VSYNC, and VEN from the core unit 10, and generates signals for realizing the following two functions. One function is a function of storing an image signal from the core unit 10 in one or two of the memories A 405 to D 408, and the other function is a function of reading out an image signal from one of the memories A 405 to D 408, and transmitting the readout signal onto the signal line 452. A dual port memory 410 is connected to the CPU 1003 of the core unit 10 via a signal line 461, and is also connected to the CPU 412 of the facsimile unit 4 via the signal line 462. The two CPUs exchange commands via the dual port memory 410. A SCSI controller 413 interfaces with a hard disk drive connected to the facsimile unit 4 shown in FIG. 1, and stores data to be transmitted or received by the facsimile unit. The CODEC 411 reads out image information stored in one of the memories A 405 to D 408, encodes the readout information by a desired one of MH, MR, and MMR methods, and stores encoded information in one of the memories A 405 to D 408. Also, the CODEC 411 reads out encoded information stored in one of the memories A 405 to D 408, decodes the readout information by a desired one of the MH, MR, and MMR methods, and stores the decoded information, i.e., image information in one of the memories A 405 to D 408. A MODEM 414 has a function of modulating encoded information from the CODEC 411 or a hard disk drive connected to the SCSI controller 413 so as to transmit it onto a telephone line, and a function of demodulating information sent from an NCU 415 into encoded information, and transferring the encoded information to the CODEC 411 or the hard disk drive connected to the SCSI controller 413. The NCU 415 is directly connected to the telephone line, and exchanges information with an exchanger arranged in a telephone office according to a predetermined protocol.

An example of facsimile transmission processing will be described below.

A two-valued image signal from the reader unit 1 is input from the connector 400, and is supplied to the buffer 401 via the signal line 451. The buffer 401 outputs a signal onto the signal line 453 via the signal line 451 according to setting data from the CPU 412. The signal on the signal line 453 is supplied to the selector 402, and is then output to the variable magnification circuit 403. The variable magnification circuit 403 converts an image signal at the resolution of 400 DPI of the reader unit 1 into an image signal with a resolution for facsimile transmission. A signal output from the variable magnification circuit 403 via the signal line 454 is stored in the memory A 405 under the control of the memory controller 404. The storage timing in the memory A 405 is generated by the timing generating circuit 409 on the basis of a timing signal transmitted from the reader unit 1 via the signal line 459. The CPU 412 connects the memories A 405 and B 406 of the memory controller 404 to the bus line 463 of the CODEC 411. The CODEC 411 reads out image information from the memory A 405, encodes the readout information by the MR method, and writes the encoded information in the memory B 406. After A4-size image information is encoded by the CODEC 411, the CPU 412 connects the memory B 406 of the memory controller 404 to the CPU bus 462. The CPU 412 sequentially reads out the encoded information from the memory B 406, and transfers the readout information to the MODEM 414. The MODEM 414 modulates the encoded information, and transmits the modulated information onto the telephone line via the NCU 415 as facsimile information.

An example of facsimile reception processing will be described below.

Information sent from the telephone line is input to the NCU 415, and is connected to the facsimile unit 4 in a predetermined protocol by the NCU 415. Information from the NCU 415 is supplied to the MODEM 414, and is demodulated. The CPU 412 stores information from the MODEM 414 in the memory C 407 via the CPU bus 462. When information for one frame is stored in the memory C 407, the CPU 412 controls the memory controller 404 to connect the data line 457 of the memory C 407 to the line 463 of the CODEC 411. The CODEC 411 sequentially reads out encoded information in the memory C 407 and decodes the readout information. Then, the CODEC 411 stores the decoded information as image information in the memory D 408. The CPU 412 communicates with the CPU 1003 in the core unit 10 via the dual port memory 410 to perform a setting operation for printing an image from the memory D 408 by the printer unit 2 via the core unit 10. Upon completion of the setting operation, the CPU 412 starts the timing generating circuit 409 to output a predetermined timing signal from a signal line 460 to the memory controller 404. The memory controller 404 reads out image information from the memory D 408 in synchronism with the signal from the timing generating circuit 409, and transmits the readout information onto the signal line 452. The signal on the signal line 452 is input to the buffer 401, and is output to the connector 400 via the signal line 451. Since the output operation of the signal from the connector 400 to the printer unit 2 has already been described in the description of the core unit 10, a detailed description thereof will be omitted.

The detailed arrangement and operation of the file unit 5 will be described below with reference to the block diagram shown in FIG. 6.

Figure 6:
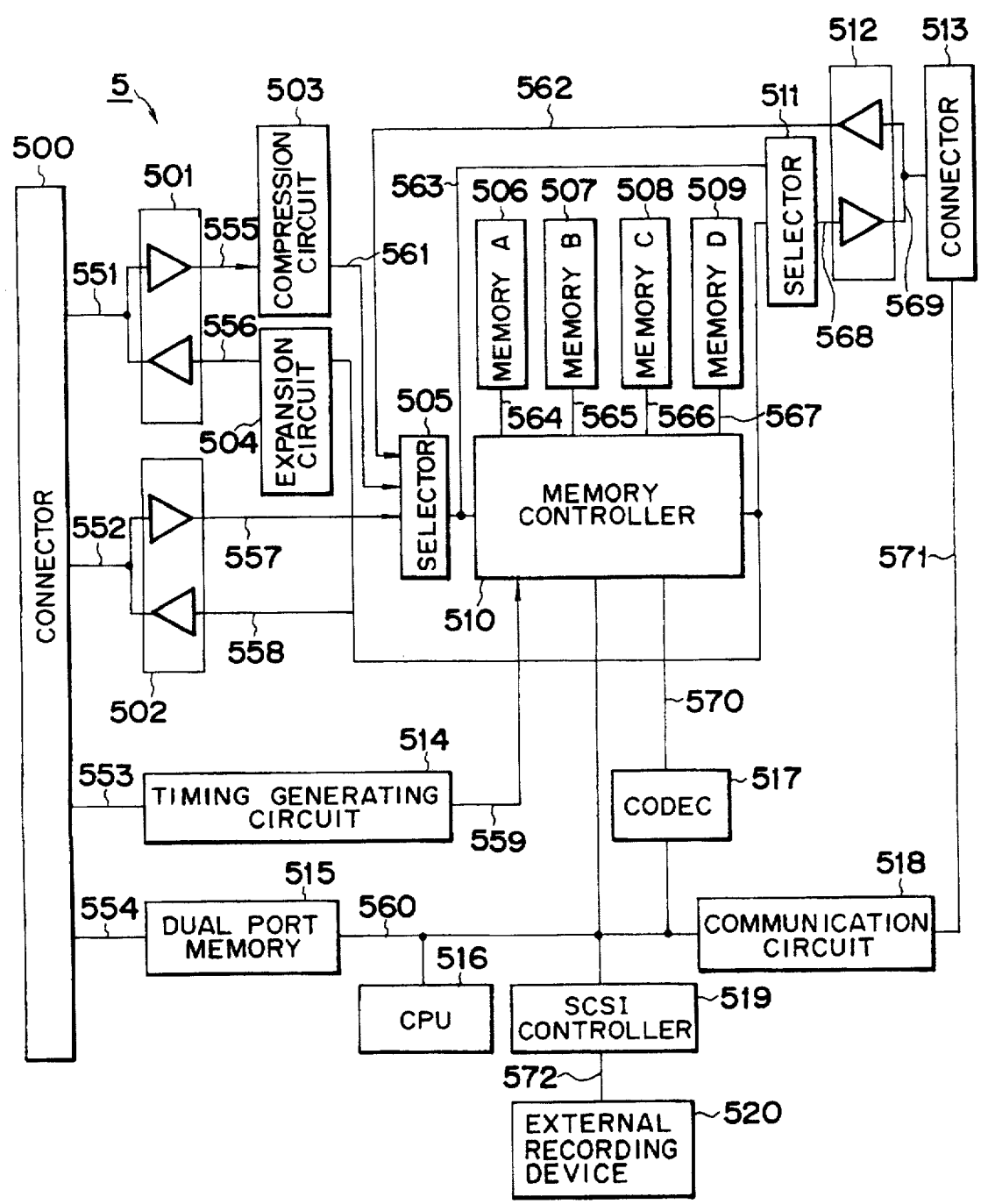
FIG. 6 is a block diagram for explaining the detailed arrangement of a file unit shown in FIG. 1.

FIG. 6 is a block diagram for explaining the detailed arrangement of the file unit 5 shown in FIG. 1.

The file unit 5 is connected to the core unit 10 via a connector 500, and exchanges various signals with the core unit 10. A signal line 551 is a bidirectional 8-bit multi-valued image signal line, and is connected to a buffer 501. A multi-valued image signal is input to a compression circuit 503 via the buffer 501 and a multi-valued input signal line 555, and is converted from multi-valued image information into two-valued compressed information. The compressed information is output to a selector 505. A signal line 552 is a bidirectional two-valued image signal line, and is connected to a buffer 502. A two-valued image signal is input to the selector 505 via the buffer 502 and a two-valued input signal line 557. The selector 505 selects one of three different signals, i.e., a signal on an output signal line 561 from the compression circuit 503, a signal on the output signal line 557 from the buffer 502, and a signal on an output signal line 562 from a buffer 512 in accordance with an instruction from a CPU 516, and supplies the selected signal to a memory controller 510. The signal from the selector 505 is also input to a selector 511 via an output signal line 563. When compressed information obtained by compressing 8-bit multi-valued information from the core unit 10 is to be stored in one of memories A 506 to D 509, the selector 505 selects a signal on the signal line 561. When two-valued information is to be stored in a memory, the selector 505 selects a signal on the signal line 557. When information from the man-machine interface unit 6 shown in FIG. 1 is to be stored in a memory, the selector 505 selects a signal on the signal line 562. A signal on the signal line 563 is stored in one of the memories A 506, B 507, C 508, and D 509, or a memory circuit obtained by cascade-connecting two memories under the control of the memory controller 510. The memory controller 510 has four functions, i.e., a mode for exchanging data between the memories A 506 to D 509 and a CPU bus 560 in accordance with an instruction from the CPU 516, a mode for exchanging data with a CODEC bus 570 of a CODEC 517 for performing encoding and decoding, a mode for storing a signal on the signal line 563 in one of the memories A 506 to D 509 under the control of a timing generating circuit 514, and a mode for reading out the memory contents of one of the memories A 506 to D 509, and outputting the readout contents onto a signal line 558. Each of the memories A 506 to D 509 has a capacity of 2 Mbytes, and stores an A4-size image or equivalent at a resolution of 400 DPI. The timing generating circuit 514 is connected to the connector 500 via a signal line 553, is started by control signals (HSYNC, HEN, VSYNC, and VEN) from the core unit 10, and generates signals for realizing the following two functions. One function is a function of storing information from the core unit 10 in one or two of the memories A 506 to D 509, and the other function is a function of reading out an image signal from one of the memories A 506 to D 509, and transmitting the readout signal onto the signal line 558. A connector 513 exchanges signals with the man-machine interface unit 6 shown in FIG. 1. Image information is input to the buffer 512, and a command is input to a communication circuit 518. A signal line 569 is a bidirectional image signal line. When the buffer 512 receives image information from the man-machine interface unit 6, it outputs the image information onto the signal line 562. When image information is to be output from the file unit 5 to the man-machine interface unit 6, information on a signal line 568 is transferred via the buffer 512 and the connector 513. A dual port memory 515 is connected to the CPU 1003 of the core unit 10 via a signal line 554, and is also connected to the CPU 516 of the file unit 5 via a signal line 560. The CPUs 1003 and 516 exchange commands via the dual port memory 515. A SCSI controller 519 interfaces with an external recording device 520 connected to the file unit 5 shown in FIG. 1. More specifically, the external recording device 520 comprises a magnetooptical disk, and stores data such as image information. The CODEC 517 reads out image information stored in one of the memories A 506 to D 509, and encodes the readout information by a desired one of the MH, MR, and MMR methods. Thereafter, the CODEC 517 stores encoded information in one of the memories A 506 to D 509. Also, the CODEC 517 reads out encoded information stored in one of the memories A 506 to D 509, and decodes the readout information by one of the MH, MR, and MMR methods. Thereafter, the CODEC 517 stores the decoded information in one of the memories A 506 to D 509 as image information.

An example of processing for storing file information in the external recording deice 520 will be described below.

An 8-bit multi-valued image signal from the reader unit 1 is input via the connector 500, and is input to the buffer 501 via the signal line 551. The buffer 501 outputs the signal on the signal line 551 onto the signal line 555 according to setting data of the CPU 516. The signal on the signal line 555 is input to the compression circuit 503, and is converted into two-valued compressed information (the signal line 561). The compressed information on the signal line 561 is input to the selector 505, and is then transferred to the memory controller 510. The signal on the signal line 563 is input to the memory controller 510, and is also input to the man-machine interface unit 6 via the selector 511, the buffer 512, and the connector 513. The memory controller 510 causes the timing generating circuit 514 to generate timing signals in accordance with the signals received from the core unit 10 via the signal line 553, and to output the generated signals onto a signal line 559. The memory controller 510 stores the compressed signal on the signal line 563 in the memory A 506 in accordance with the generated timing signals. The CPU 516 connects the memories A 506 and B 507 of the memory controller 510 to the bus line 570 of the CODEC 517. The CODEC 517 reads out compressed information from the memory A 506, and encodes the readout information by the MR method. The encoded information is written in the memory B 507. Upon completion of encoding by the CODEC 517, the CPU 516 connects the memory B 507 of the memory controller 510 to the CPU bus 560. The CPU 516 sequentially reads out the encoded information from the memory B 507, and transfers the readout information to the SCSI controller 519. The SCSI controller 519 records the encoded information on a signal line 572 in the external recording device 520.

An example of print processing for reading out information from the external recording device 520, and outputting the readout information from the printer unit 2 will be described below.

Upon reception of a search.print instruction of information from the man-machine interface unit 6, the CPU 516 receives encoded information from the external recording device 520 via the SCSI controller 519, and transfers the encoded information to the memory C 508. At this time, the memory controller 510 connects the CPU bus 560 to a bus 566 of the memory C 508 according to an instruction from the CPU 516. Upon completion of transfer of the encoded information to the memory C 508, the CPU 516 controls the memory controller 510 to connect the memories C 508 and D 509 to the bus 570 of the CODEC 517. The CODEC 517 sequentially reads out the encoded information from the memory C 508, and decodes the readout information. Thereafter, the CODEC 517 transfers the decoded information to the memory D 509. The CPU 516 communicates with the CPU 1003 of the core unit 10 via the dual port memory 515 to perform a setting operation for printing out an image from the memory D 509 by the printer unit 2 via the core unit 10. Upon completion of the setting operation, the CPU 516 starts the timing generating circuit 514 to output predetermined timing signals from the signal line 559 to the memory controller 510. The memory controller 510 reads out the decoded information from the memory D 509 in synchronism with the signals from the timing generating circuit 514, and transmits the readout information onto the signal line 558. The signal on the signal line 558 is input to an expansion circuit 504, and the decoded information is expanded. The output signal from the expansion circuit 504 is input to the buffer 501 via a signal line 556, and is then output to the connector 500 via the signal line 551. Since the output operation of the signal from the connector 500 to the printer unit 2 has already been described in the description of the core unit 10, a detailed description thereof will be omitted.

The arrangement and display processing operation of the man-machine interface unit 6 shown in FIG. 1 will be described below with reference to the block diagram shown in FIG. 7.

Figure 7:
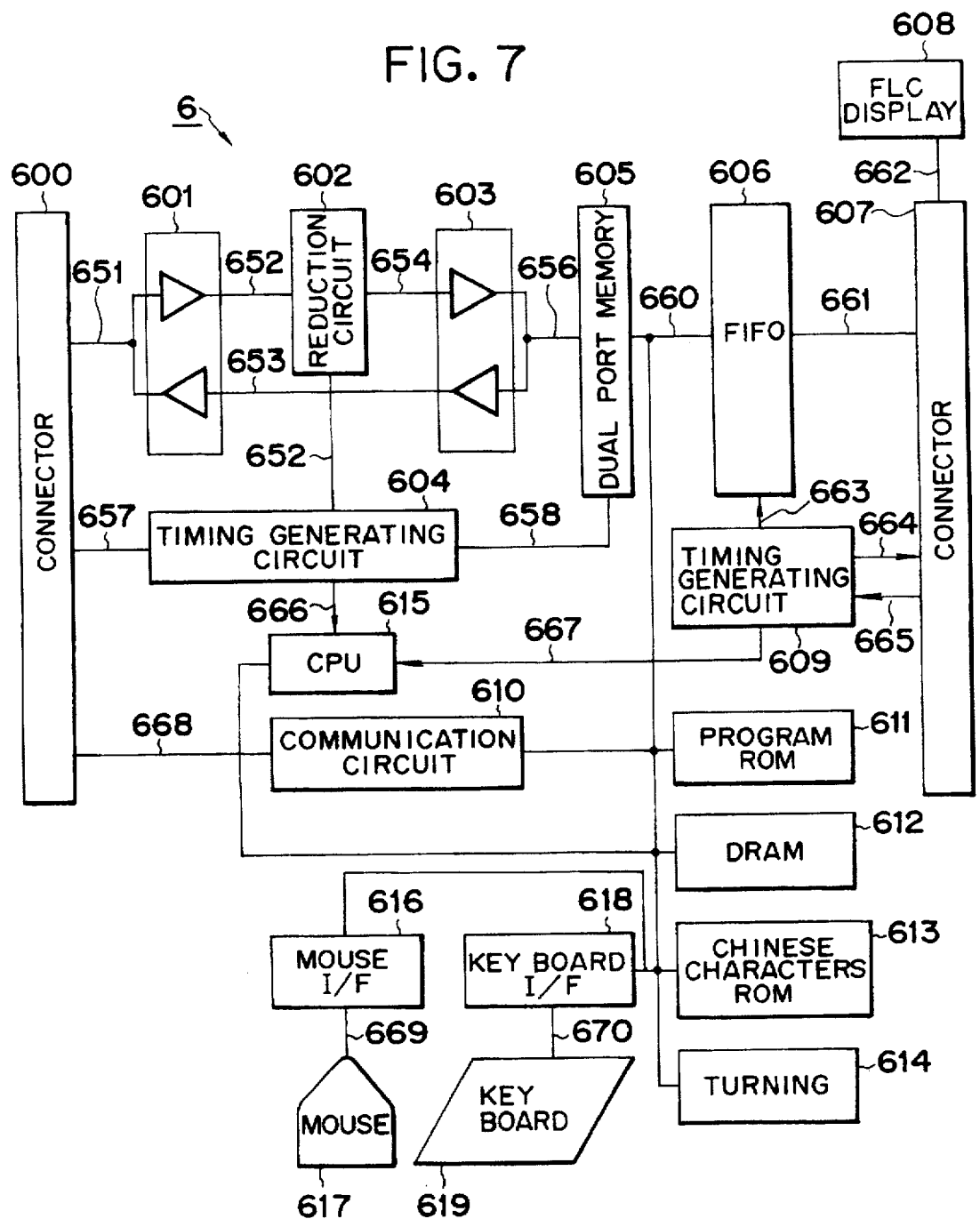
FIG. 7 is a block diagram for explaining the detailed arrangement of a man-machine interface unit shown in FIG. 1.

FIG. 7 is a block diagram for explaining the detailed arrangement of the man-machine interface unit 6 shown in FIG. 1.

An example of processing for receiving image information from the file unit 5, and displaying the received image information on a display will be described below.

A connector 600 is connected to the connector 513 of the file unit 5 via a cable. A CPU 615 causes a communication circuit 610 to communicate with the CPU 516 of the file unit via a CPU bus 660 so as to set an image input mode. An image signal output from the connector 600 via a bidirectional signal line 651 is input to a buffer 601. A signal output from the buffer 601 is input to a reduction circuit 602 via a signal line 652. The reduction circuit 602 reduces the input image signal in correspondence with the display size of an FLC (ferroelectric liquid crystal) display 608. The output signal from the reduction circuit 602 is input to a dual port memory 605 via a signal line 654 and a buffer 603. In this case, the signal is written in the dual port memory 605 in accordance with signals output from a timing generating circuit 604 via a signal line 658. The timing generating circuit 604 is started by timing signals transmitted from the file unit 5 via a signal line 657. When image information for one line is written in the dual port memory 605, the timing generating circuit 604 issues a DMA (direct memory access) request to the CPU 516 by a signal output via a signal line 666. The CPU 615 causes its internal DMAC (direct memory access controller) to transfer image information from the dual port memory 605 to a DRAM (dynamic random-access memory) 612 via the CPU bus 660. Upon repetition of the above-mentioned operation, image information for one frame is stored in the DRAM 612. The FLC display 608 is connected to a connector 607 via a cable 662. An image request signal (to be referred to as a signal FHSYNC hereinafter) transmitted through a signal line 665 is output to a timing generating circuit 609. Upon reception of the signal FHSYNC, the timing generating circuit 609 outputs a DMA request signal to the CPU 615 via a signal line 667. Upon reception of the DMA request signal, the CPU 615 starts the internal DMAC to DMA-transfer the line address of 1-line data to be displayed on the FLC display 608, and image information for one line from the DRAM 612 to a FIFO memory 606 via the CPU bus 660. The timing generating circuit 609 outputs timing signals via a signal line 663 to read out image information for one line from the FIFO memory 606, and transfers the readout information to the FLC display 608. The FLC display 608 determines an image display position on the basis of the line address to be displayed, and displays the image information for one line. Upon repetition of the above-mentioned operation, image information for one frame is displayed on the entire screen of the FLC display.

An example of transfer processing for transferring image information in the man-machine interface unit 6 to the file unit 5 will be described below.

The CPU 615 communicates with the CPU 516 of the file unit 5 via the communication circuit 610 to set an image output mode. Image information in the man-machine interface unit 6 is stored in the DRAM 612. Upon reception of a DMA request signal from the timing generating circuit 604 via the signal line 666, the CPU 615 transfers image information for one line from the DRAM 612 to the dual port memory 606. Then, the CPU 615 reads out image information from the dual port memory 605 via a signal line 656 in accordance with a read timing signal output from the timing generating circuit 604 via the signal line 658. The image signal output from the dual port memory 605 is output to the connector 600 via the signal line 656, the buffer 603, and the buffer 601. Since the internal operation of the file unit 5 has already been described, a detailed description thereof will be omitted.

A keyboard interface 618 and a mouse interface 616 respectively communicate with a keyboard and a pointing device (mouse), and issue operation instructions and the like to the man-machine interface unit 6.

The arrangement and operation of the computer interface unit 7 shown in FIG. 1 will be described below with reference to the block diagram in FIG. 8.

Figure 8:
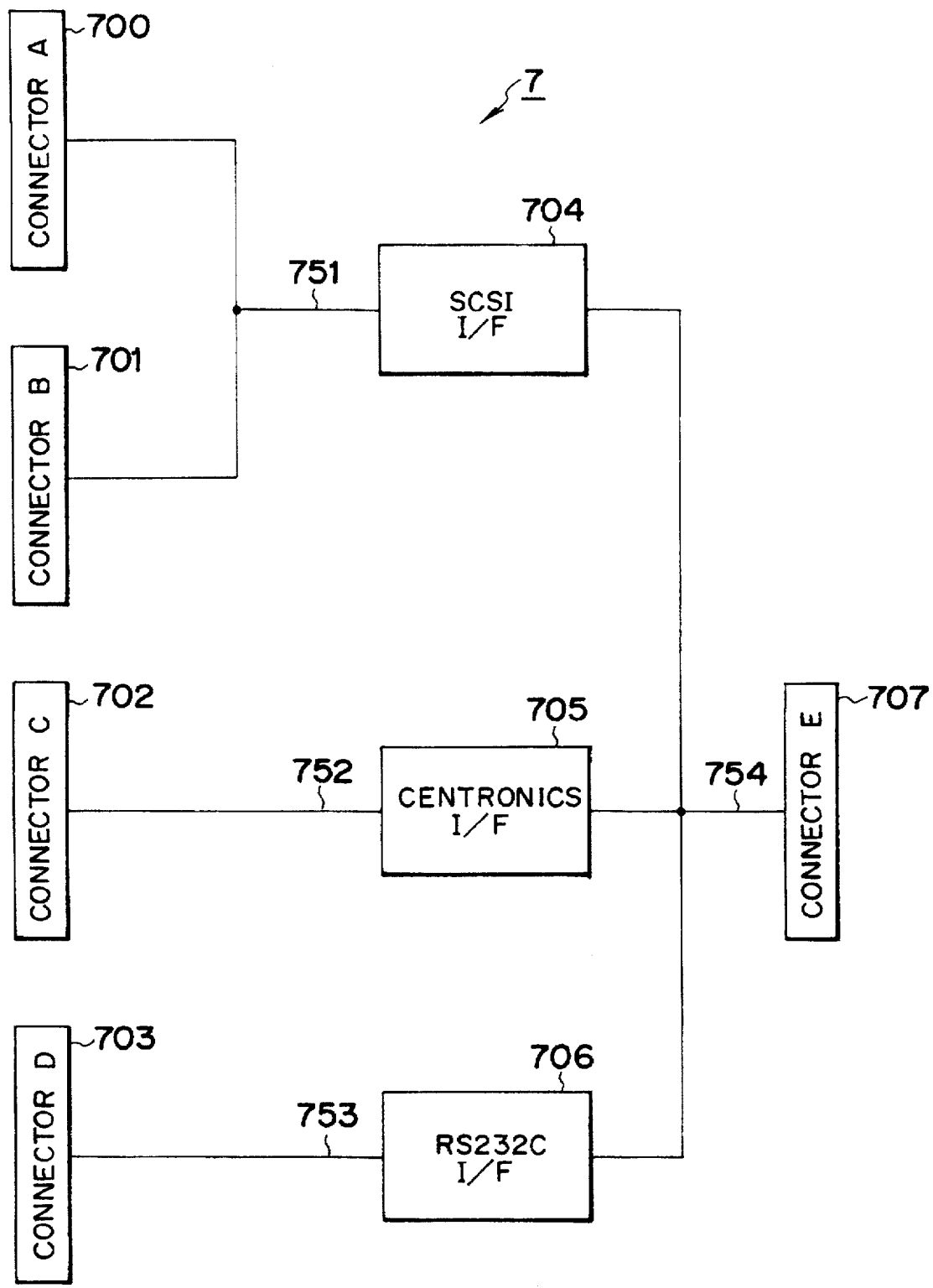
FIG. 8 is a block diagram for explaining the detailed arrangement of a computer interface unit shown in FIG. 1.

FIG. 8 is a block diagram showing the detailed arrangement of the computer interface unit 7 shown in FIG. 1.

A connector A 700 and a connector B 701 are those for the SCSI interface. A connector C 702 is one for the Centronics interface. A connector D 703 is one for the RS232C interface. A connector E 707 is one for connecting the core unit 10. A SCSI interface 704 has the two connectors 700 and 701. When a device having a plurality of SCSI interfaces is to be connected, it is cascade-connected using the connectors 700 and 701. When one peripheral device control device 3 is connected to a single computer, the connector 700 is connected to the computer via a cable, and a terminator is connected to the connector 701, or vice versa. Information input from the connector 700 or 701 is output to the SCSI interface 704 via a signal line 751. The SCSI interface 704 executes a procedure based on a SCSI protocol, and then, outputs data to the connector E 707 via a signal line 754. The connector 707 is connected to the CPU bus 1053 of the core unit 10, and the CPU 1003 receives, from the CPU bus 1053, information input to the SCSI interface connector (the connector 700 or 701). Data is output from the CPU 1003 of the core unit 10 to the SCSI connector (the connector 700 or 701) in a procedure opposite to that described above. A Centronics interface 705 is connected to the connector C 702 via a signal line 752. The Centronics interface 705 receives data according to a procedure based on a predetermined protocol, and outputs the data to the connector E 707 via the signal line 754. The connector 707 is connected to the CPU bus 1053 of the core unit 10, and the CPU 1003 of the core unit 10 receives, from the CPU bus 1053, information input to the Centronics interface connector C (the connector 702).

An RS232C interface 708 is connected to the connector D 703 via a signal line 753. An RS232C interface 706 receives data in a procedure based on a predetermined protocol, and outputs data to the connector E 707 via the signal line 754. The connector 707 is connected to the CPU bus 1053 of the core unit 10, and the CPU 1003 of the core unit 10 receives, from the CPU bus 1053, information input to the RS232C interface connector (the connector 703). Data from the CPU 1003 of the core unit 10 is output to the RS232C interface connector (the connector 703) in a procedure opposite to that described above.

The arrangement and operation of the formatter unit 8 shown in FIG. 1 will be described below with reference to the block diagram shown in FIG. 9.

FIG. 9 is a block diagram for explaining the detailed arrangement of the formatter unit 8 shown in FIG. 1.

FIG. 9 is a block diagram for explaining the detailed arrangement of the formatter unit 8 shown in FIG. 1.

Data from the above-mentioned computer interface unit 7 is discriminated by the core unit 10. When the core unit 10 discriminates that the data from the unit 7 is data associated with the formatter unit 8, the CPU 1003 of the core unit 10 transfers data from the computer to a dual port memory 803 via the connector 1012 of the core unit 10 and a connector 800 of the formatter unit 8. A CPU 809 of the formatter unit 8 receives code data supplied from the computer via the dual port memory 803. The CPU 809 sequentially develops the code data to image data, and transfers the image data to a memory A 806 or B 807 via a memory controller 808. Each of the memories A 806 and B 807 has a memory capacity of 2 Mbytes, and one memory (the memory A 806 or B 807) can store an A4-size image at a resolution of 400 DPI. When an A3-size image at a resolution of 400 DPI is to be stored, the memories A 806 and B 807 are cascade-connected, and image data is developed onto these memories. The above-mentioned memory control is executed by the memory controller 808 in accordance with an instruction from the CPU 809. When turning of character data, figure data, or the like is required upon development of image data, the data is turned by a turning circuit 804, and thereafter, is transferred to the memory A 806 or B 807. Upon completion of development of image data onto the memory A 806 or B 807, the CPU 809 controls the memory controller 808 to connect a data bus line 858 of the memory A 806 or a data bus line 859 of the memory B 807 to an output line 855 of the memory controller 808. Then, the CPU 809 communicates with the CPU 1003 of the core unit 10 via the dual port memory 803 to set a mode for outputting image information from the memory A 806 or B 807. The CPU 1003 of the core unit 10 sets a print out mode in the CPU 122 using an internal communication function of the CPU 122 of the reader unit 1 via the communication circuit 1002 in the core unit 10. The CPU 1003 of the core unit 10 starts a timing generating circuit 802 via the connector 1013 and the connector 800 of the formatter unit 8. The timing generating circuit 802 generates timing signals for reading out image information from the memory A 806 or B 807 in accordance with signals from the core unit 10. Image information from the memory A 806 or B 807 is input to a variable magnification circuit 801 via the signal lines 858 and 855. The variable magnification circuit 801 performs variable magnification processing in accordance with an instruction from the CPU 809, and transfers the processed information to the core unit 10 via a signal line 851 and the connector 800. Since the output operation from the core unit 10 to the printer unit 2 has already been described in the description of the core unit 10, a detailed description thereof will be omitted.

The arrangement and operation of the image memory unit 9 shown in FIG. 1 will be described below with reference to the block diagram shown in FIG. 10.

FIG. 10 is a block diagram for explaining the detailed arrangement of the image memory unit 9 shown in FIG. 1.

The image memory unit 9 is connected to the core 10 unit 10 via a connector 900, and exchanges various signals with the core unit 10. A signal line 951 is a bidirectional 8-bit multi-valued image signal line, and a signal on the signal line 951 is input to a buffer 901. A multi-valued image signal output from the buffer 901 is stored in a memory 904 via a signal line 954 under the control of a memory controller 905. The memory controller 905 has three functions, i.e., a mode for exchanging data between the memory 904 and a CPU bus 957 in accordance with an instruction from a CPU 906, a mode for storing an image signal transmitted via the signal line 954 in the memory 904 under the control of a timing generating circuit 902, and a mode for reading out an image signal from the memory 904 and outputting the readout signal onto a signal line 955. The memory 904 has a storage capacity of 32 Mbytes, and stores an A3-size image or equivalent at a resolution of 400 DPI and 256 gray levels. The timing generating circuit 902 is connected to the connector 900 via a signal line 952, is started by control signals (HSYNC, HEN, VSYNC, and VEN) from the core unit 10, and generates signals for achieving the following two functions. One function is a function for storing information from the core unit 10 in the memory 904, and the other function is a function for outputting an image signal read out from the memory 904 onto the signal line 955. A dual port memory 903 is connected to the CPU 1003 of the core unit 10 via a signal line 953, and is also connected to the CPU 906 of the image memory unit 9 via the signal line 957. The CPUs 1003 and 906 exchange commands via the dual port memory 903. An example of transfer processing for storing image information in the image memory unit 9, and transferring the stored information will be described below.

An 8-bit multi-valued image signal from the reader unit 1 is input from the connector 900, and is then input to the buffer 901 via the signal line 951. The buffer 901 outputs the signal to the memory controller 905 via the signal line 954 in accordance with setting data of the CPU 906. The memory controller 905 causes the timing generating circuit 902 to generate timing signals in accordance with signals transmitted from the core unit 10 via the signal line 952. A signal on the signal line 954 is stored in the memory 904 in accordance with the generated timing signals. The CPU 906 connects the memory 904 of the memory controller 905 to the CPU bus 957. The CPU 906 sequentially reads out image information from the memory 904, and transfers the readout information to the dual port memory 903. The CPU 1003 of the core unit 10 reads out image information in the dual port memory 903 of the image memory unit 9 via the signal line 953 and the connector 900, and transfers the readout information to the computer interface unit 7. The information transfer processing to the computer interface unit 7 has already been described, and a detailed description thereof will be omitted. An example of image output processing for outputting image information sent from the computer via the printer unit 2 will be described below.

Image information sent from the computer is supplied to the core unit 10 via the computer interface unit 7. The CPU 1003 of the core unit 10 transfers the image information to the dual port memory 903 of the image memory unit 9 via the CPU bus 1053 and the connector 1013. At this time, the CPU 906 controls the memory controller 905 to connect the CPU bus 957 to the bus of the memory 904. The CPU 906 transfers the image information from the dual port memory 903 to the memory 904 via the memory controller 905. Upon completion of transfer of image information to the memory 904, the CPU 906 controls the memory controller 905 to connect the data line of the memory 904 to the signal line 955. The CPU 906 communicates with the CPU 1003 of the core unit 10 via the dual port memory 903 to perform a setting operation for printing out an image from the memory 904 by the printer unit 2 via the core unit 10. Upon completion of the setting operation, the CPU 906 starts the timing generating circuit 902 to output predetermined timing signals to the memory controller 905 via a signal line 956. The memory controller 905 reads out image information from the memory 904 in synchronism with the signals from the timing generating circuit 902, and transmits the readout information onto the signal line 955. The signal on the signal line 955 is input to the buffer 901, and is then output to the connector 900 via the signal line 951. The output operation from the connector 900 to the printer unit 2 has already been described in the description of the core unit 10, and a detailed description thereof will be omitted.

In the above-mentioned arrangement, as various setting/input operation means, the operation unit 124 of the reader unit 1, a keyboard 619 of the file unit 5, the keyboard of the computer or work station 790 connected to the connectors A 700 to D 703 of the computer interface unit 7 are available. These operations means are connected to the CPU 1003 of the core unit 10 via the corresponding communication means, as has been described above in the corresponding paragraphs.

The CPU 1003 of the core unit 10 always communicates with the connected peripheral devices. When an operation setting input is made by some operation means, a corresponding command code is transmitted to the CPU 1003. After command interpretation, a sequence program is executed to generate an operation command to an operation-requested function. At this time, if priority order setting data and operation inhibition setting data are registered in the sequence program, operation matching with the purpose of use of a user can be realized.

When image data is to be received from the peripheral device control device using the third function, if conditions set by each peripheral device are sent in advance in a communication protocol, various conditions are interpreted by the CPU 412 via the MODEM 414 in a training sequence in a reception mode. Furthermore, when the CPU 412 sends a command to the CPU 1003 of the core unit 10 via the dual port memory 410, the functions of this system can be remote-controlled.

The image input/output control operation in the image processing apparatus according to the present invention will be described below.

In this embodiment, a case will be explained below wherein image information is input form the scanner input 104 to the file unit 5 via the core unit 10, while the formatter unit 8 develops command data of, e.g., a document file sent from the computer interface unit 7 into image data, and the image data is output to the printer unit 2 via the core unit 10.

The CPU 516 of the file unit 5 communicates with the CPU 1003 of the core unit 10 via the dual port memory 515 to generate an image input request. Upon generation of the image input request, as shown in FIG. 11, the CPU 516 of the file unit 5 transmits various parameters as a packet to the CPU 1003 of the core unit 10.

FIG. 11 is a view for explaining the format of an image input/output control command packet in the image processing apparatus according to the present invention.

As shown in FIG. 11, the image input/output control command packet includes an image input command code 2000, an image input/output management parameter group 2020, an image attribute information management parameter group 2030, an image processing management parameter group 2040, and the like. Each parameter group includes the following parameters.

More specifically, the image input/output management parameter group 2020 includes an image request unit ID 2001 serving as an identification code for discriminating a unit to be used in requested image processing, an image transmitting side unit ID 2002 serving as an identification code for discriminating an image transmitting side unit, and an image receiving side unit ID 2003 serving as an identification code for discriminating an image receiving side unit. In this embodiment, the request unit ID 2001 corresponds to the file unit, the image transmitting side unit corresponds to the scanner unit, and the image receiving side unit corresponds to the file unit.

The image attribute information management parameter group 2030 includes delay quantities 2004 and 2005 of the horizontal and vertical scanning directions for designating resolution conversion and defining offsets of image information, the numbers 2006 and 2007 of pixels of the horizontal and vertical scanning directions, resolutions 2008 and 2009 of the horizontal and vertical directions of a requested image, and the like.

Furthermore, the image processing management parameter group 2040 includes a copy number parameter 2010 for designating the number of copies of an image, a turning angle parameter 2011 serving as an image turning processing request, a resolution conversion parameter 2012, and the like. The CPU 516 transmits the command packet with the above-mentioned format to the CPU 1003 of the core unit 10. Upon reception of this command packet from the CPU 516 of the file unit 5, the CPU 1003 of the core unit 10 sends back a signal indicating that the packet was normally received to the CPU 516 of the file unit 5. Then, the CPU 1003 of the core unit 10 interprets the received command packets, and forms an image transmission job management table, as shown in FIG. 12. The CPU 1003 then registers the received command packet in the memory as a job.

FIG. 12 shows an example of the image transmission job management table in the image processing apparatus according to the present invention.

Referring to FIG. 12, a sequence step 2100 serves as a parameter for managing the progress state of the registered job. A job number 2101 serves as an identification number of the registered job. A registered image request ID 2102 is the same as the image request unit ID 2001. A registered image transmitting side unit ID 2103 is the same as the image transmitting side unit ID 2002. A registered image receiving side unit ID 2104 is the same as the image receiving side unit ID 2003. A resolution conversion unit 2105 serves as a parameter for defining if resolution conversion is performed by the image transmitting side unit or the image receiving side unit when a resolution conversion request is issued. Job status 2106 serves as information for managing the executing state or execution result of the job. Image transmitting side unit status 2107 serves as a parameter reflecting the operating state of the image transmitting side unit.

Image receiving side unit status 2108 serves as a parameter reflecting the operating state of the image receiving side unit. The number 2109 of finished copies serves as a parameter indicating the number of copies for which image transmission is normally finished. A continuation flag 2110 serves as information for defining if a corresponding page is the last page of originals. A turning angle 2111 serves as a parameter indicating the turning angle of an image. The CPU 1003 of the core unit 10 forms such an image transmission job management table, and also forms an image transmission parameter table shown in FIG. 13 for each of the image transmitting and receiving side units.

FIG. 13 shows an example of the image transmission parameter table in the image processing apparatus according to the present invention.

Referring to FIG. 13, a resolution conversion designation 2200 is a parameter which is set in accordance with the resolution conversion request in the image processing management parameter group 2040 in the command packet. A delay quantity parameter 2201 is set based on the delay quantity 2004 of the horizontal scanning direction, which defines an offset of image information. A delay quantity parameter 2202 is set based on the delay quantity 2005 of the vertical scanning direction. A pixel number parameter 2203 is set based on the number 2006 of pixels of the horizontal scanning direction. A pixel number parameter 2204 is set based on the number 2007 of pixels of the vertical scanning direction. A resolution parameter 2205 is set based on the resolution 2008 of the horizontal direction of a requested image. A resolution parameter 2206 is set based on the resolution 2009 of the vertical direction of the requested image. A turning request parameter 2207 is set based on the turning angle 2011. A copy number parameter 2208 is set based on the number 2010 of copies.

A case will be explained below wherein the CPU 809 of the formatter unit 8 communicates with the CPU 1003 of the core unit 10 via the dual port memory 803 to issue an image output request. In this case, substantially the same description described above will be given although some parameters in the description of the image input request of the file unit 5 are changed.

The job priority setting control operation in the multiple functions image processing apparatus according to the present invention will be described below with reference to the flow chart in FIG. 14 and FIGS. 15 to 17C.

Figure 14:
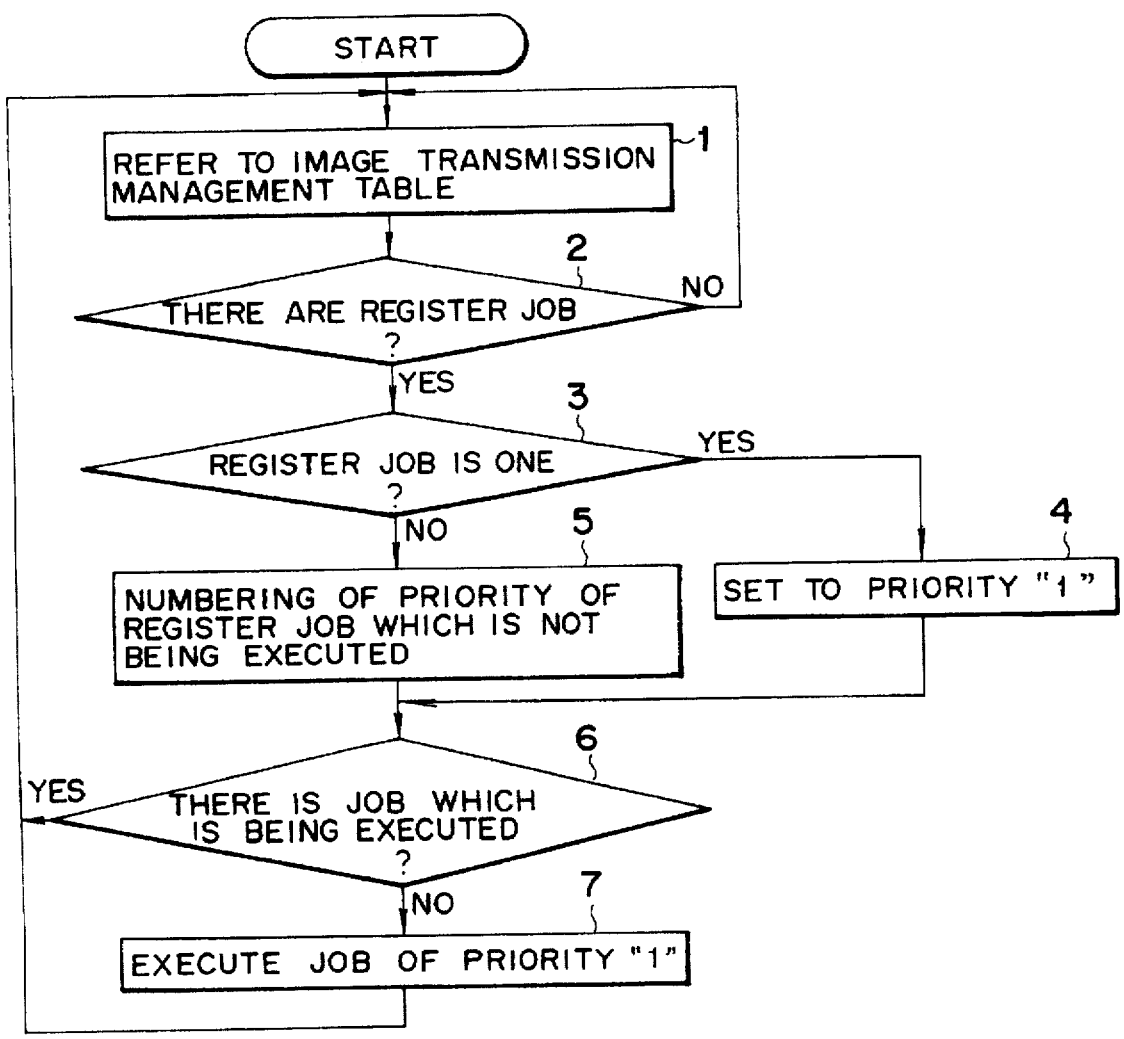
FIG. 14 is a flow chart showing an example of a priority setting control sequence of jobs in the multiple functions image processing apparatus according to the present invention.

FIG. 14 is a flow chart showing the job priority setting control sequence in the multiple functions image processing apparatus according to the present invention. Note that (1) to (7) are step numbers.

In step (1), the CPU 1003 of the core unit 10 refers to the image transmission job management table and the image transmission parameter tables of the image transmitting and receiving side units corresponding to the jobs in the image transmission job management table. In step (2), it is checked with reference to the sequence step 2100 if there are registered jobs. If N (NO) in step (2), the flow returns to step (1); otherwise, the flow advances to step (3) to check if the number of registered jobs is "1". If it is determined in step (3) that only one job is currently registered, the flow advances to step (4), and the registered job is set to priority "1" as the highest value. Thereafter, the flow advances to step (6) and subsequent steps.

Figure 15:
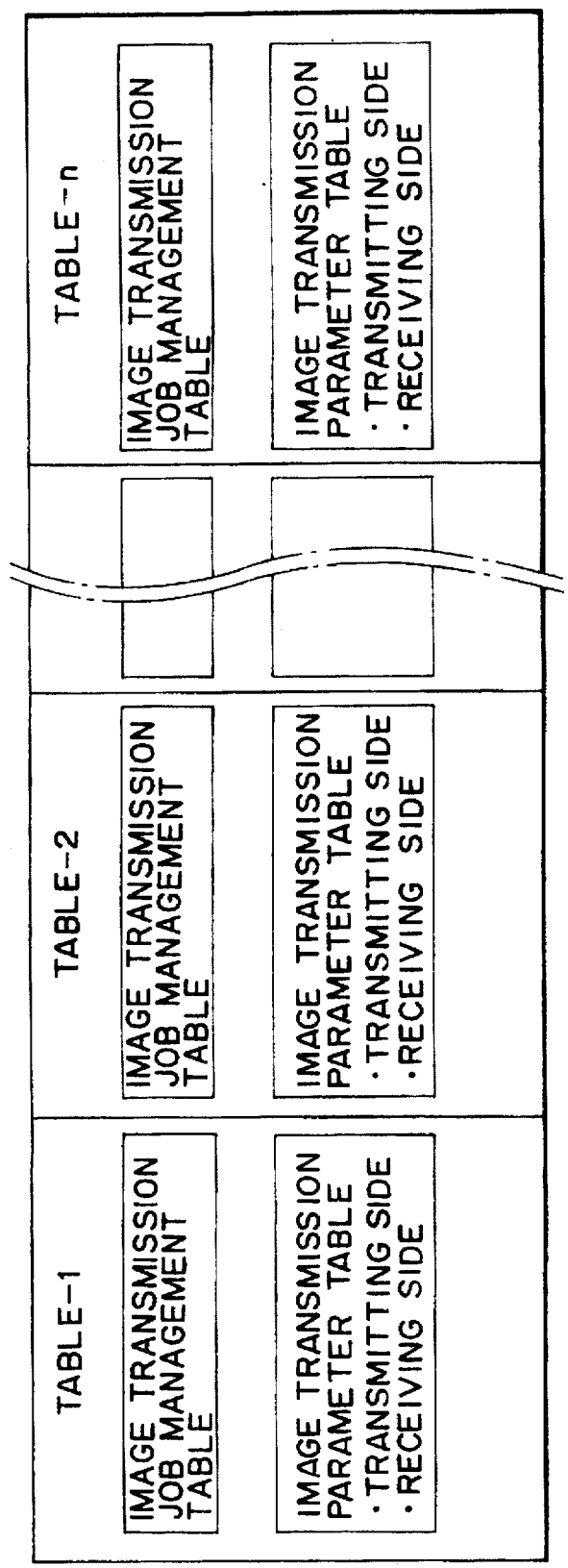
FIG. 15 is a view for explaining the priority setting control state of jobs in the multiple functions image processing apparatus according to the present invention.
Figure 16:
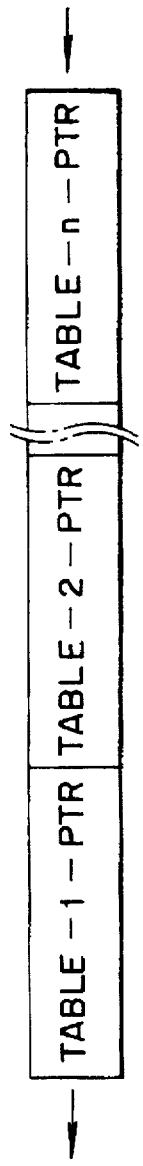
FIG. 16 is a view for explaining the priority setting control state of jobs in the multiple functions image processing apparatus according to the present invention.

If it is determined in step (3) that a plurality of jobs are registered, the execution priority levels of a plurality of currently registered jobs, excluding the job being executed, are determined in the following order. The image transmission job management table shown in FIG. 12 and the image transmission parameter table shown in FIG. 13 are stored in a memory (not shown; comprising, e.g., a ring buffer) of the core unit 10. The memory is designed to be able to store a plurality of sets of these tables, as shown in FIG. 15. Also, a table pointer management area indicating the start addresses of corresponding table storage areas is prepared on the memory of the core unit 10, as shown in FIG. 16. The table pointer management area can time-serially store a plurality of pointers. More specifically, the table storage addresses of the respective jobs are time-serially registered in the table pointer management area after the parameters are stored in the image transmission job management table and the image transmission parameter table. Therefore, only when the image transmission job management table has significant contents, a pointer (storage address) is additionally stored in the table pointer management area. For this reason, at the time of step (5), the storage addresses are time-serially registered in the table pointer management area in the generation order of jobs. Since the number of copies is proportional to the execution time of a job, the registered image transmission job management tables and the numbers 2208 of copies in the image transmission parameter tables are sequentially referred to, and jobs are sorted in an ascending order from those with smaller numbers of copies, thereby re-sorting the pointers in the table pointer management area. It is checked, with reference to the image transmitting side unit ID 2102 and the image receiving side unit ID 2104 in the image transmission job management table, if the image request is an image input request (i.e., an image input from the reader unit 1) or an image output request (i.e., an image output to the printer unit 2). Based on this checking result, the re-sorted pointers in the table pointer management area are re-sorted again, so that image input and output requests alternately appear. FIGS. 17A to 17C show the re-sorting states of the pointers. In FIGS. 17A to 17C, a numerical value in parentheses indicates the number of copies.

In step (6), it is checked with reference to sequence step 2100 if there is a job which is being executed. If N in step (6), the flow advances to step (7).

In step (7), the pointer (storage address) registered at the head of the above-mentioned table pointer management area is read out, and a job stored at the storage address is executed. After execution of the job, the flow returns to step (1).

In this embodiment, a case has been exemplified wherein image information is input from the scanner unit 104 to the file unit 5 via the core unit 10, while the formatter unit 8 develops command data of, e.g., a document file sent from the computer interface unit 7 to image data, and the image data is output to the printer unit 2 via the core unit 10. However, the combination of image input/output operations is not limited to that in the above embodiment, and the same processing can be realized between other image input and output units.

Also, the time required for processing may be estimated on the basis of the resolution of an image, the number of pixels, the presence/absence of turning, the number of images, processing contents, and the like in each processing request, jobs may be sorted in an order from those with shorter times. Thereafter, the jobs may be re-sorted, so that input and output requests alternately appear.

The present invention is not limited to the above-mentioned embodiment, and various changes and modifications may be made within the scope of appended claims.

What is claimed is:

1. An image processing apparatus comprising:
   input means for inputting a plurality of instructions for image processing jobs, each of which image processing jobs treats a different image independently;
   storage means for storing the plurality of instructions input by said input means;
   decision means for deciding whether processing of each image processing job takes a long time or a short time based on respective processing contents of the image processing jobs respectively corresponding to the plurality of instructions input by said input means;
   discrimination means for discriminating whether the processing corresponding to each of the plurality of instructions input by said input means inputs an image or outputs an image; and
   control means for sorting an execution order of the plurality of instructions stored in said storage means in accordance with a decision result provided by said decision means, and further sorting the execution order of the plurality of sorted instructions in accordance with a discrimination result provided by said discrimination means so that processing which inputs an image and processing which outputs an image alternately appear,
   wherein said control means executes each of the image processing jobs according to the execution order of the plurality of sorted instructions.

2. An apparatus according to claim 1, wherein said control means estimates an amount of time required for processing of each of the image processing jobs on a basis of recording number information included in each of the instructions.

3. An apparatus according to claim 1, wherein said control means sorts the execution order of the plurality of instructions except for instructions which are being executed.

4. An image processing apparatus comprising:
   input means for inputting a plurality of instructions for image processing jobs, each of which image processing jobs treats a different image independently;
   storage means for storing the plurality of instructions input by said input means; and
   control means for discriminating whether respective contents of each of the instructions correspond to a processing which inputs an image or a processing which outputs an image, sorting an execution order of the plurality of instructions stored in said storage means, such that processing which inputs an image and processing which outputs an image alternately appears, and executing each of the image processing jobs according to the execution order of the plurality of sorted instructions.

5. An apparatus according to claim 4, wherein said control means sorts the execution order of the plurality of instructions except for an instruction which is being executed.

6. An apparatus according to claim 4, wherein said control means executes the image processing job which outputs the image while the image processing job for inputting the image is executed according to the execution order.

7. An image processing method comprising the steps of:
inputting a plurality of instructions for image processing jobs, each of which image processing jobs treats a different image independently;
storing the plurality of instructions input in said input step;
deciding whether processing of each image processing job takes a long time or a short time based on respective processing contents of the image processing jobs respectively corresponding to the plurality of instructions input in said input step;
discriminating whether the processing corresponding to each of the plurality of instructions input in said input step inputs an image or outputs an image; and
sorting an execution order of the plurality of instructions stored in said storing step in accordance with a decision result of said deciding step, and further sorting the execution order of the plurality of sorted instructions in accordance with a discrimination result of said discriminating step so that processing which inputs an image and processing which outputs an image alternately appear, wherein each of the image processing jobs is executed according to the execution order of the plurality of sorted instructions.

8. A method according to claim 7, wherein said said sorting step estimates an amount of time required for processing of each of the image processing jobs on a basis of recording number information included in each of the instructions.

9. A method according to claim 7, wherein said sorting step sorts the execution order of the plurality of instructions except for instructions which are being executed.

10. An image processing method comprising the steps of:
inputting a plurality of instructions for image processing jobs, each of which image processing jobs treats a different image independently;
storing the plurality of instructions input in the input step;
discriminating whether contents of each of the instructions correspond to a processing which inputs an image or a processing which outputs an image;
sorting an execution order of the plurality of instructions stored in the storage step, such that processing which inputs an image and processing which outputs an image alternately appears; and
executing each of the image processing jobs according to the execution order of the plurality of sorted instructions.

11. A method according to claim 10, wherein said sorting step sorts the execution order of the plurality of instruction except for an instruction which is being executed.

12. A method according to claim 10, wherein said executing step executes the image processing job which outputs the image while the image processing job for inputting the image is executed according to the execution order.

13. An image processing apparatus including a plurality of units, comprising:
input means for inputting a plurality of instructions for image processing jobs, each of which image processing jobs treats a different image independently and uses one of said plurality of units;
storage means for storing the plurality of instructions input by said input means;
discrimination means for discriminating which unit is to be used for the image processing job respectively corresponding to each instruction input by said input means;
determining means for determining an order to execute each of the instructions according to a discrimination result provided by said discriminating means; and
executing means for executing each of the image processing jobs according to the order determined by said determining means.

14. An apparatus according to claim 13, wherein one of the plurality of units is a reading unit for reading an image of an original.

15. An apparatus according to claim 13, wherein one of the plurality of units is a printing unit for printing out an image.

16. An apparatus according to claim 13, wherein the order determined by said determining means is an order that the image processing jobs using different units alternately appear.

17. An image processing method for an apparatus including a plurality of image processing units, comprising the steps of:
inputting a plurality of instructions for a plurality of image processing jobs each of which image processing jobs treats a different image independently;
storing the input instructions in storage means;
discriminating one of the plurality of image processing units which is used in the image processing job respectively corresponding to each of the input instructions; and
determining an order of executing each of the instructions according to a discrimination result of said discriminating step.

18. A method according to claim 17, wherein one of the plurality of units is a reading unit for reading an image of an original.

19. A method according to claim 17, wherein one of the plurality of units is a printing unit for printing out an image.

20. A method according to claim 17, wherein the order determined in said determining step is an order that jobs using different units alternately appear.

* * * * *

UNITED STATES PATENT AND TRADEMARK OFFICE
CERTIFICATE OF CORRECTION

PATENT NO. : 5,724,154

DATED : March 3, 1998

INVENTOR(S): HIROHIKO ITO ET AL.

It is certified that error appears in the above-identified patent and that said Letters Patent is hereby corrected as shown below:

IN THE DRAWINGS

ON SHEET 1:

Figure 1, "FORMT" should read --FORMATTER--; and "BOAD" should read --BOARD--.

ON SHEET 4:

Figure 4, "FORMT" should read --FORMATTER--.

ON SHEET 16:

Figure 17C, "IMAE" should read --IMAGE--.

COLUMN 2:

Line 60, "EMBODIMENT" should read --EMBODIMENTS--.

COLUMN 3:

Line 41, "generation-" should read --generation.--;
Line 42, ".color" should read --color--;
Line 54, "magnification" should read --magnification.--; and
Line 67, "trimming" should read --.trimming--.

UNITED STATES PATENT AND TRADEMARK OFFICE
CERTIFICATE OF CORRECTION

PATENT NO. : 5,724,154

DATED : March 3, 1998

INVENTOR(S): HIROHIKO ITO ET AL.

It is certified that error appears in the above-identified patent and that said Letters Patent is hereby corrected as shown below:

COLUMN 4:

Line 1, "outline" should read --.outline--;
Line 5, "masking" should read --, masking,--;
Line 7, "trimming" should read --.trimming--; and
Line 25, "color" should read --.color--.

COLUMN 8:

Line 18, "generation-" should read --generation.--; and
Line 19, ".color" should read --color--.

COLUMN 9:

Line 33, "selector" (second occurrence) should read --selectors--

COLUMN 13

Line 38, "deice" should read --device--.

COLUMN 16

Lines 37-38, "FIG. 9. . . . in FIG. 1." should be deleted.

UNITED STATES PATENT AND TRADEMARK OFFICE
CERTIFICATE OF CORRECTION

PATENT NO. : 5,724,154

DATED : March 3, 1998

INVENTOR(S): HIROHIKO ITO ET AL.

It is certified that error appears in the above-identified patent and that said Letters Patent is hereby corrected as shown below:

COLUMN 17

Line 27, "10" should be deleted.

COLUMN 19

Line 7, "form" should read --from--.

COLUMN 23

Line 30, "said" (second occurrence) should be deleted.

Signed and Sealed this

Twenty-seventh Day of October, 1998

Attest:

BRUCE LEHMAN

*Attesting Officer*    *Commissioner of Patents and Trademarks*